US012573539B2

(12) United States Patent
Sakurai et al.

(10) Patent No.: US 12,573,539 B2
(45) Date of Patent: Mar. 10, 2026

(54) COIL-TYPE ELECTRONIC COMPONENT

(71) Applicant: TDK CORPORATION, Tokyo (JP)

(72) Inventors: Yu Sakurai, Tokyo (JP); Takashi Suzuki, Tokyo (JP); Hideyuki Itoh, Tokyo (JP); Kouichi Kakuda, Tokyo (JP); Ryuichi Wada, Tokyo (JP); Nami Enomoto, Tokyo (JP); Yusuke Nagai, Tokyo (JP); Kunihiko Kawasaki, Tokyo (JP); Shinichi Kondo, Tokyo (JP); Yuya Ishima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 913 days.

(21) Appl. No.: 17/717,673

(22) Filed: Apr. 11, 2022

(65) Prior Publication Data

US 2022/0336140 A1 Oct. 20, 2022

(30) Foreign Application Priority Data

Apr. 12, 2021 (JP) ................................ 2021-067203

(51) Int. Cl.

| | |
|---|---|
| ***H01F 27/28*** | (2006.01) |
| ***H01F 1/147*** | (2006.01) |
| ***H01F 1/20*** | (2006.01) |

(52) U.S. Cl.

CPC ..... *H01F 27/2847* (2013.01); *H01F 1/14733* (2013.01); *H01F 1/14766* (2013.01); *H01F 1/20* (2013.01)

(58) Field of Classification Search

CPC ............ H01F 27/2847; H01F 1/14733; H01F 1/14766; H01F 1/20; H01F 1/14758; H01F 1/26; H01F 2003/106; H01F 3/10; H01F 17/0033; H01F 17/0013; H01F 17/04; H01F 27/255; H01F 27/34

USPC ........................................ 336/199, 200, 232

See application file for complete search history.

(56) References Cited

U.S. PATENT DOCUMENTS

| | | | | |
|---|---|---|---|---|
| 2008/0100410 | A1 | 5/2008 | Tomita et al. | |
| 2014/0097927 | A1* | 4/2014 | Yamamoto ............ | H01F 27/255 336/200 |
| 2016/0293315 | A1* | 10/2016 | Kim .................... | H01F 17/0013 |
| 2019/0221351 | A1* | 7/2019 | Jeong ...................... | H01F 27/24 |
| 2020/0027653 | A1* | 1/2020 | Terauchi ............... | H01F 41/046 |
| 2020/0051720 | A1* | 2/2020 | Li ........................ | H01F 27/2804 |
| 2021/0335534 | A1* | 10/2021 | Kojo .................. | H01F 17/0013 |

FOREIGN PATENT DOCUMENTS

| | | | |
|---|---|---|---|
| JP | 2008-135674 | A | 6/2008 |
| JP | 2016-009859 | A | 1/2016 |
| JP | 2020-013936 | A | 1/2020 |
| JP | 2021-174937 | A | 11/2021 |

* cited by examiner

*Primary Examiner* — Tszfung J Chan
*Assistant Examiner* — Kazi S Hossain
(74) *Attorney, Agent, or Firm* — Oliff PLC

(57) ABSTRACT

A coil-type electronic component comprises an element including a magnetic element body and a coil conductor. A portion of the magnetic element body in between layers of the coil conductor adjacent to each other in an axis direction of the coil conductor includes first soft magnetic metal particles. A portion of the magnetic element body on an outer side along the axis includes second soft magnetic metal particles. The first soft magnetic metal particles have a saturation magnetization (Ms) higher than that of the second soft magnetic metal particles.

9 Claims, 22 Drawing Sheets

FIG. 1A1
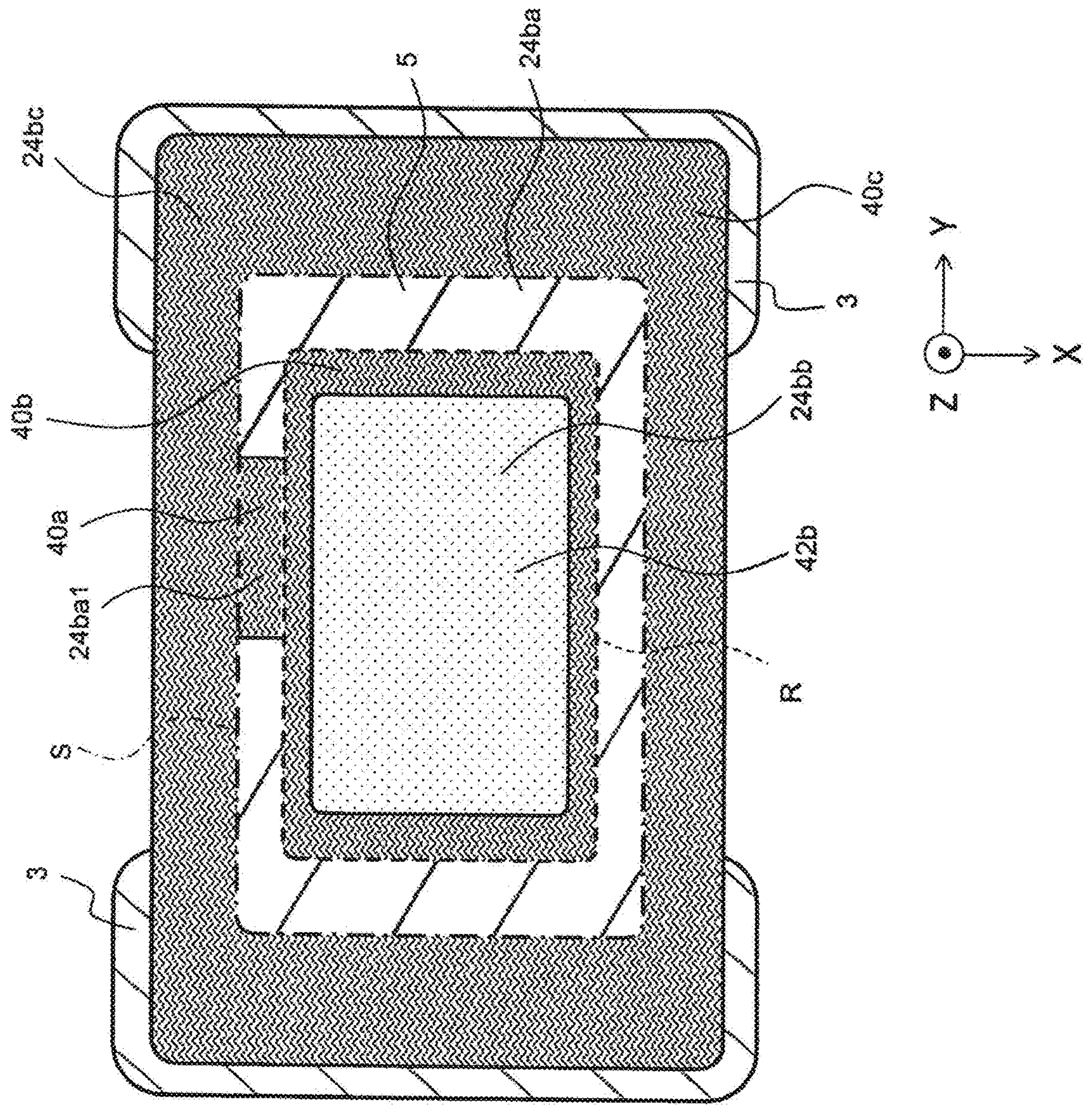

COIL-TYPE ELECTRONIC COMPONENT

TECHNICAL FIELD

The present invention relates to a coil-type electronic component.

BACKGROUND

Patent Literature 1 describes an invention related to a soft magnetic alloy powder including Fe—Ni-based particles in which each amount of Fe, Ni, Co, and Si is controlled within a specific range.

However, while having high inductance, a multilayer coil in which the Fe—Ni-based particles are included as a magnetic element body unfortunately has low DC superimposition characteristic.

Patent Literature 1: JP Patent Application Laid Open No. 2008-135674

BRIEF SUMMARY OF THE INVENTION

It is an objective of the present invention to provide a coil-type electronic component having sufficiently high inductance (L) and DC superimposition characteristic (Idc).

A coil-type electronic component according to the present invention comprises an element including a magnetic element body and a coil conductor, wherein a portion of the magnetic element body in between layers of the coil conductor adjacent to each other in an axis direction of the coil conductor includes first soft magnetic metal particles, a portion of the magnetic element body on an outer side along the axis includes second soft magnetic metal particles, and the first soft magnetic metal particles have a saturation magnetization higher than that of the second soft magnetic metal particles.

With the above configurations, the coil-type electronic component according to the present invention has sufficiently high inductance and DC superimposition characteristic.

The first soft magnetic metal particles preferably comprise an Fe—Si-based alloy. The saturation magnetization of the first soft magnetic metal particles can thus be further increased. As a result, it is easier to increase the saturation magnetization of the first soft magnetic metal particles compared to the saturation magnetization of the second soft magnetic metal particles, which can improve inductance and DC superimposition characteristic sufficiently.

The second soft magnetic metal particles preferably comprise an Fe—Ni-based alloy. It is thus easier to increase the saturation magnetization of the first soft magnetic metal particles compared to the saturation magnetization of the second soft magnetic metal particles, which can improve inductance and DC superimposition characteristic sufficiently.

A second inner-diameter magnetic element body occupying at least a part of an axis-center inner-diameter region of the element including the axis of the coil conductor preferably includes the second soft magnetic metal particles.

A proportion of an area of the second inner-diameter magnetic element body in an area of the axis-center inner-diameter region is preferably 30% or more in a cross section perpendicular to the axis of the coil conductor. A balance between inductance and DC superimposition characteristic can thus be further improved.

The first soft magnetic metal particles preferably have an average particle size of 1 to 6 μm. When the average particle size of the first soft magnetic metal particles is 1 to 6 μm, inductance can be increased compared to when the average particle size of the first soft magnetic metal particles is smaller than 1 μm. Also, when the average particle size of the first soft magnetic metal particles is 1 to 6 μm, it is possible to increase inductance compared to when the average particle size of the first soft magnetic metal particles exceeds 6 μm, prevent plating elongation, and reduce the number of short circuits.

The second soft magnetic metal particles preferably have an average particle size of 1 to 15 μm. When the average particle size of the second soft magnetic metal particles is 1 to 15 μm, inductance can be increased compared to when the average particle size of the second soft magnetic metal particles is smaller than 1 μm. Also, when the average particle size of the second soft magnetic metal particles is 1 to 15 μm, it is possible to improve DC superimposition characteristic compared to when the average particle size of the second soft magnetic metal particles exceeds 15 μm, prevent plating elongation, and reduce the number of short circuits.

A second outer-diameter magnetic element body occupying at least a part of an axis-center outer-diameter region of the element on an outer side in a radial direction of the coil conductor preferably includes the second soft magnetic metal particles. Inductance can thus be further increased.

A proportion of an area of the second outer-diameter magnetic element body in an area of the axis-center outer-diameter region may be 15% or more in a cross section perpendicular to the axis of the coil conductor. DC superimposition characteristic can thus be further increased.

BRIEF DESCRIPTION OF THE DRAWING(S)

Figure 1:
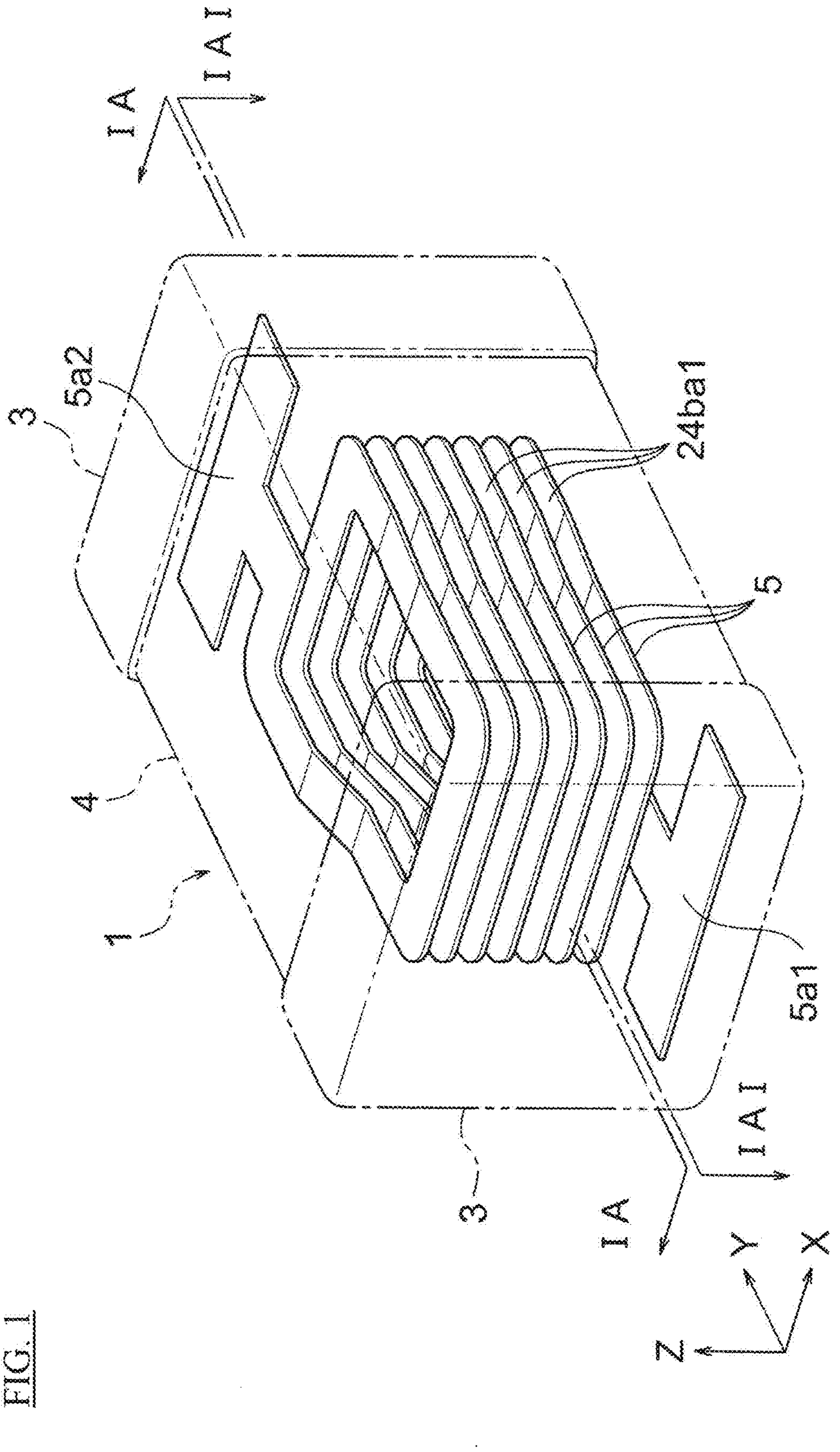
FIG. 1 is a perspective view of a multilayer coil according to an embodiment of the present invention.
Figure 1A:
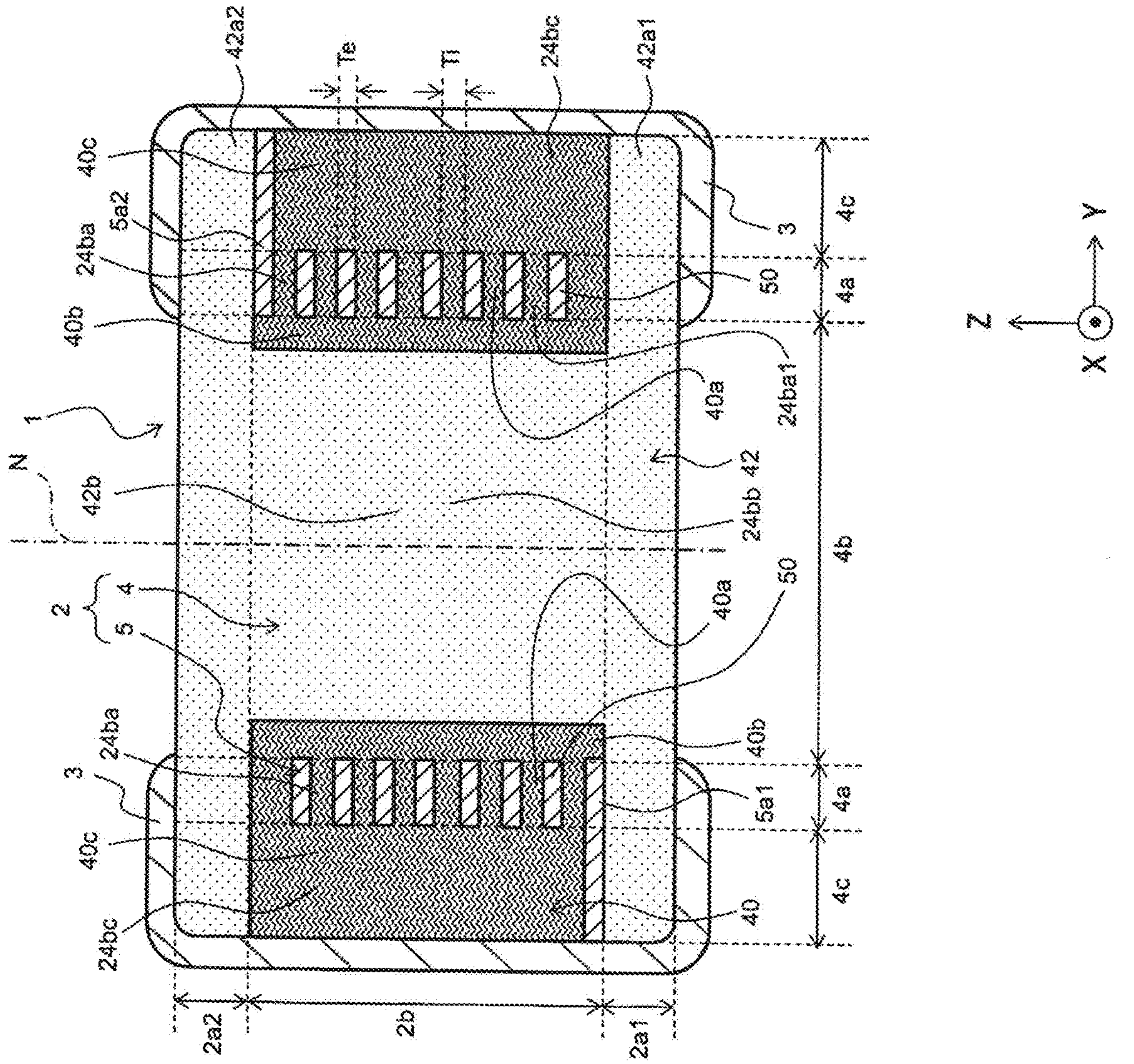
FIG. 1A is a schematic cross-sectional view along the line IA-IA in FIG. 1.

FIG. 1A1 is a schematic cross-sectional view along the line IAI-IAI in FIG. 1.

Figure 1B:
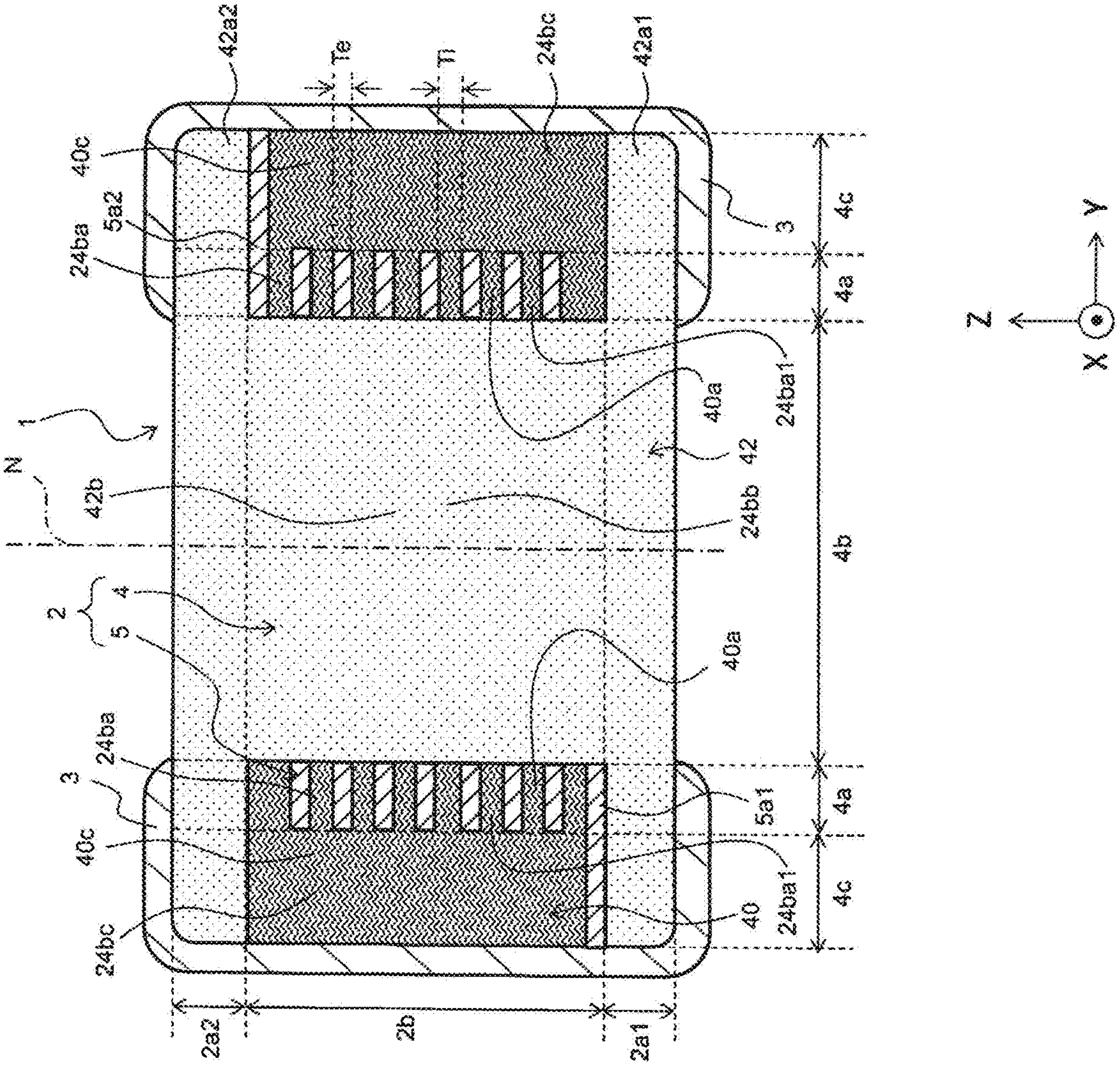

FIG. 1B is a schematic cross-sectional view of a multilayer coil according to another embodiment of the present invention.

Figure 1C:
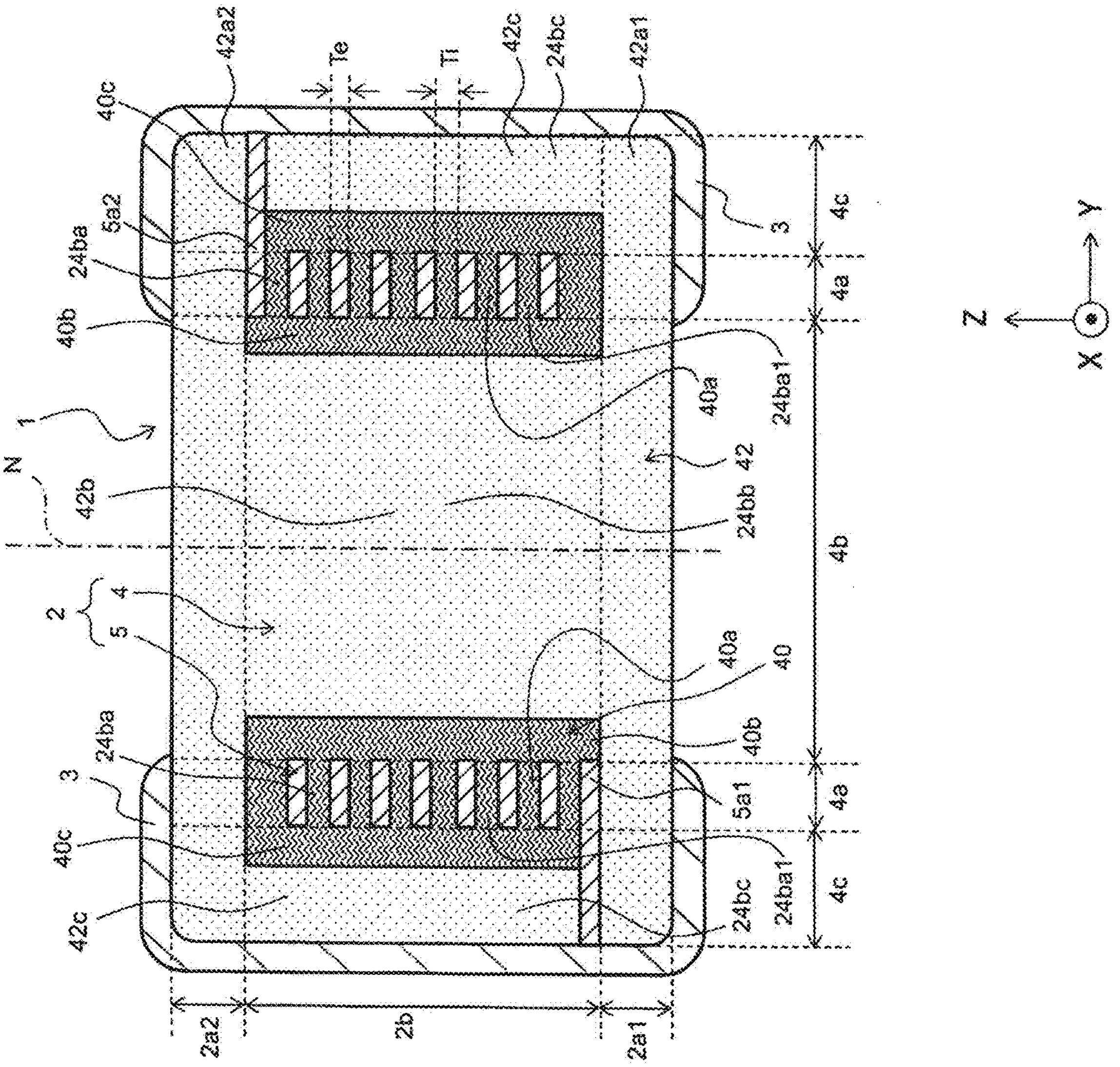

FIG. 1C is a schematic cross-sectional view of a multilayer coil according to another embodiment of the present invention.

Figure 1D:
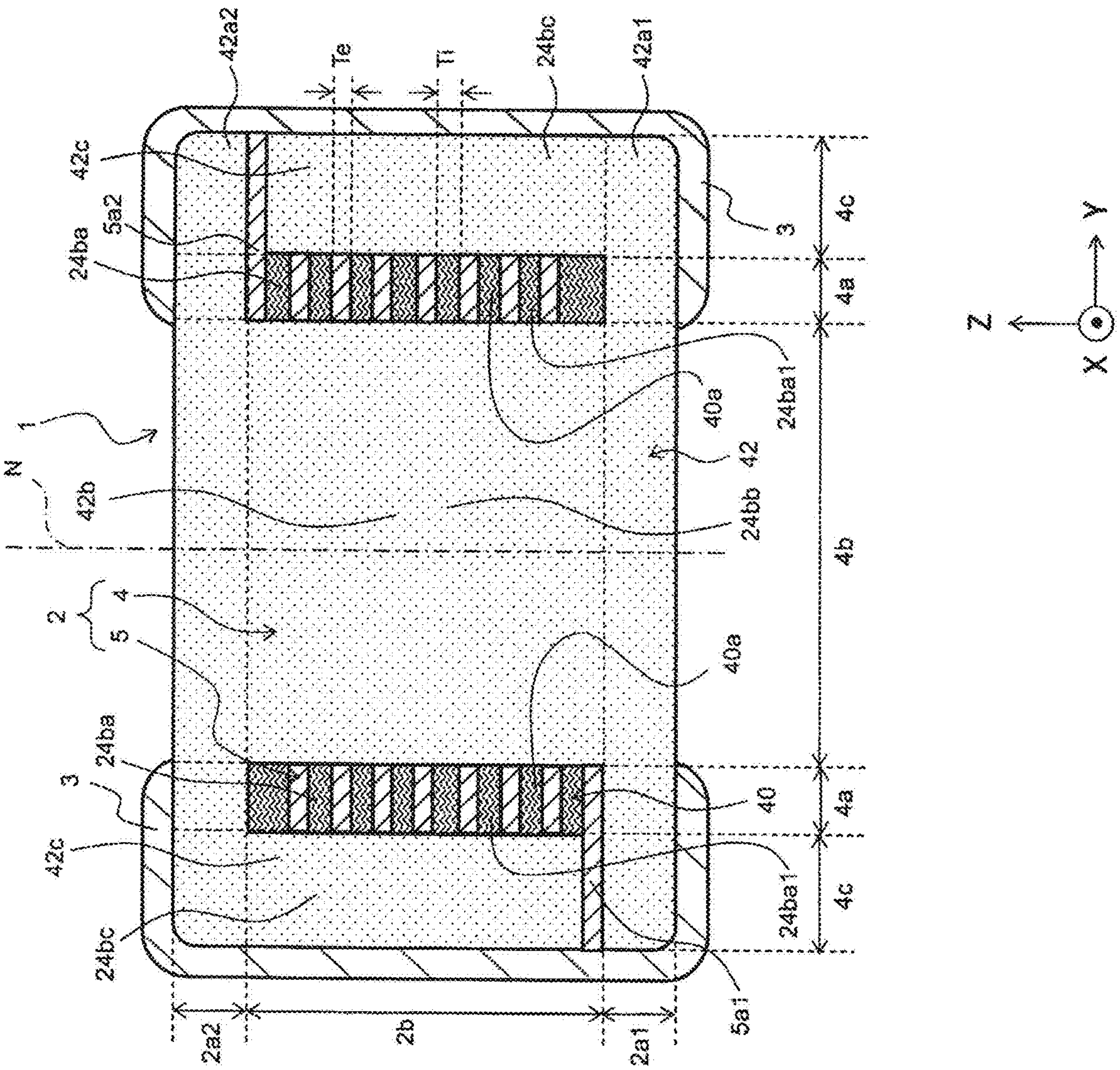

FIG. 1D is a schematic cross-sectional view of a multilayer coil according to another embodiment of the present invention.

Figure 1E:
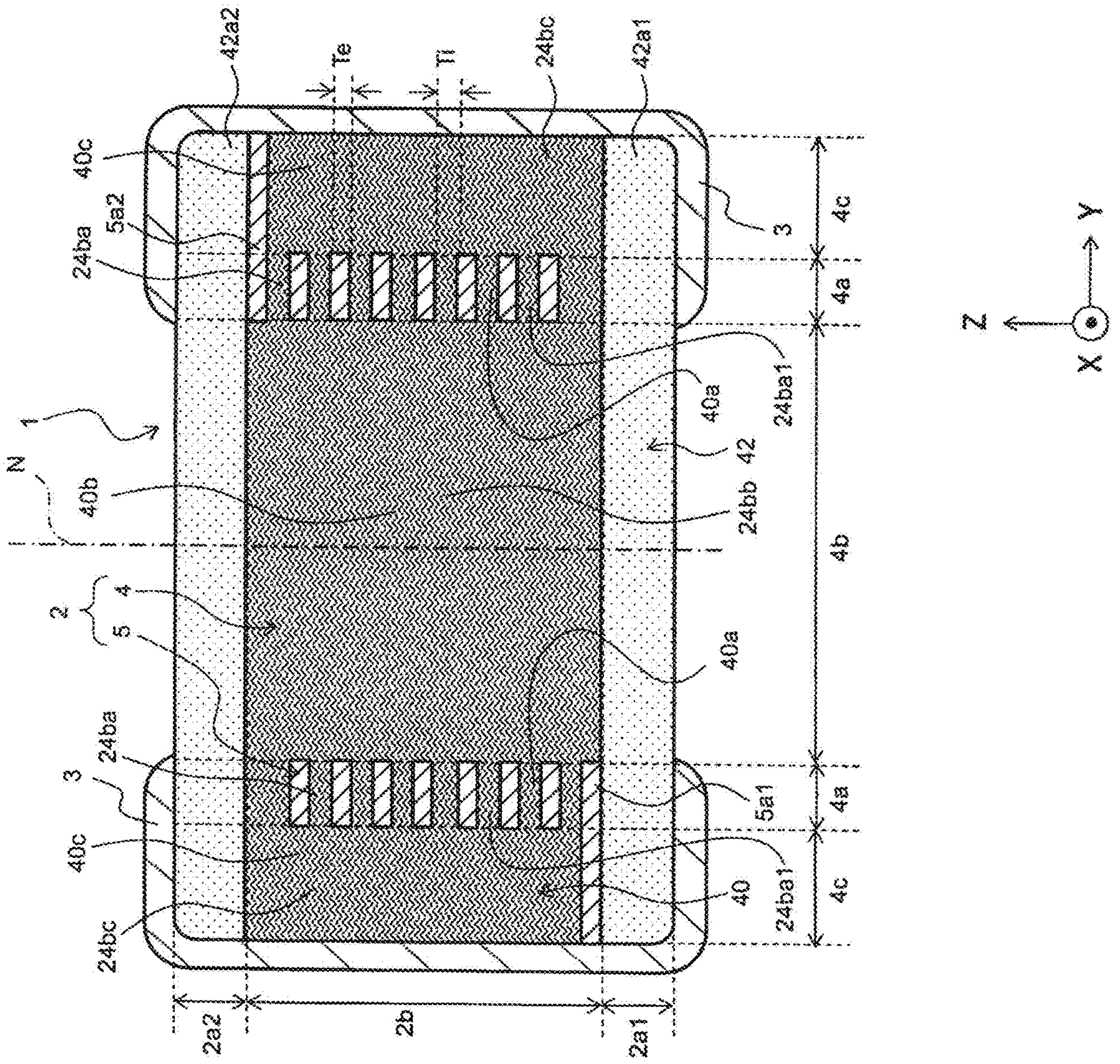

FIG. 1E is a schematic cross-sectional view of a multilayer coil according to another embodiment of the present invention.

Figure 2A:
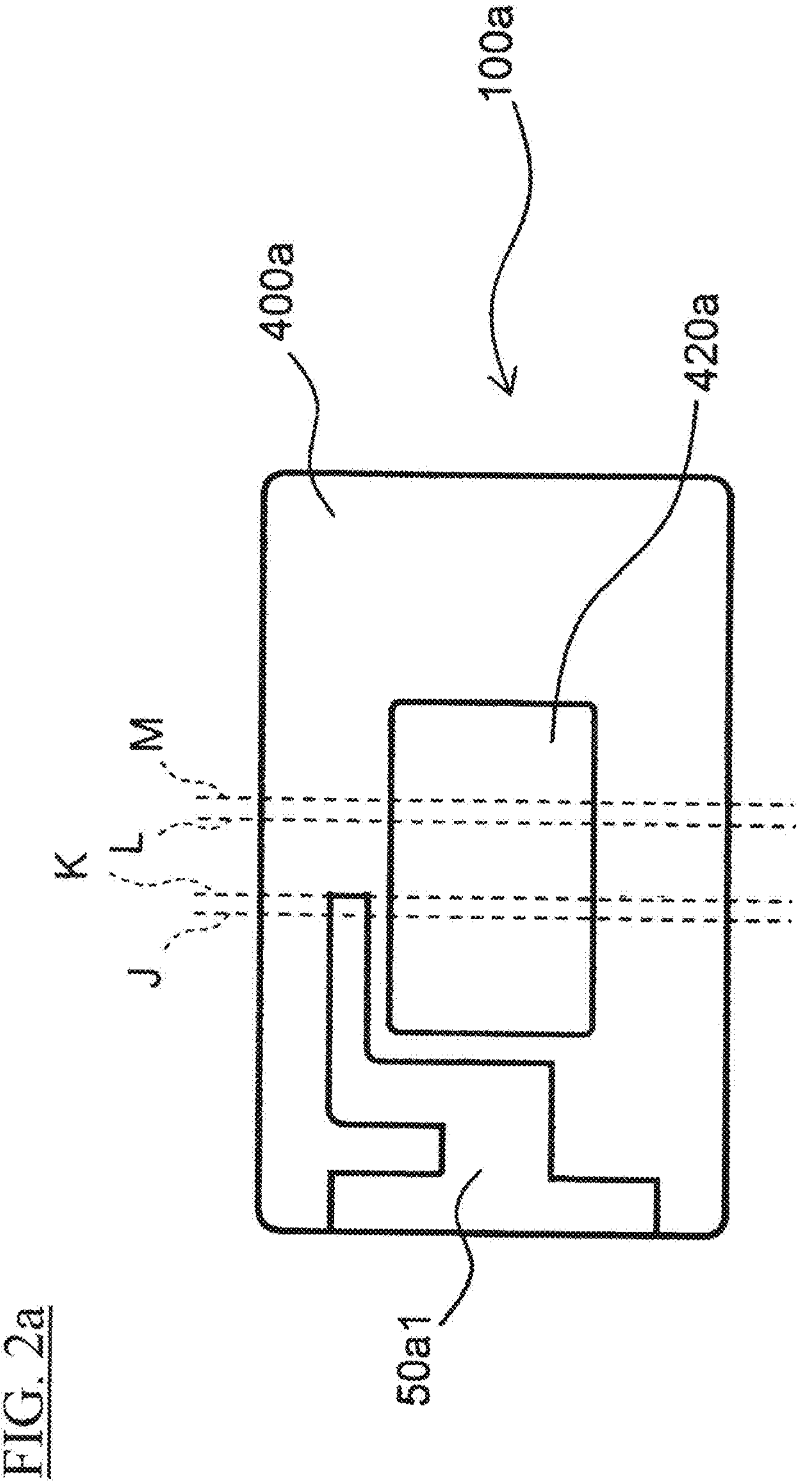

FIG. 2*a* is a diagram for describing a method of manufacturing the multilayer coil shown in FIG. 1A.

Figure 2B:
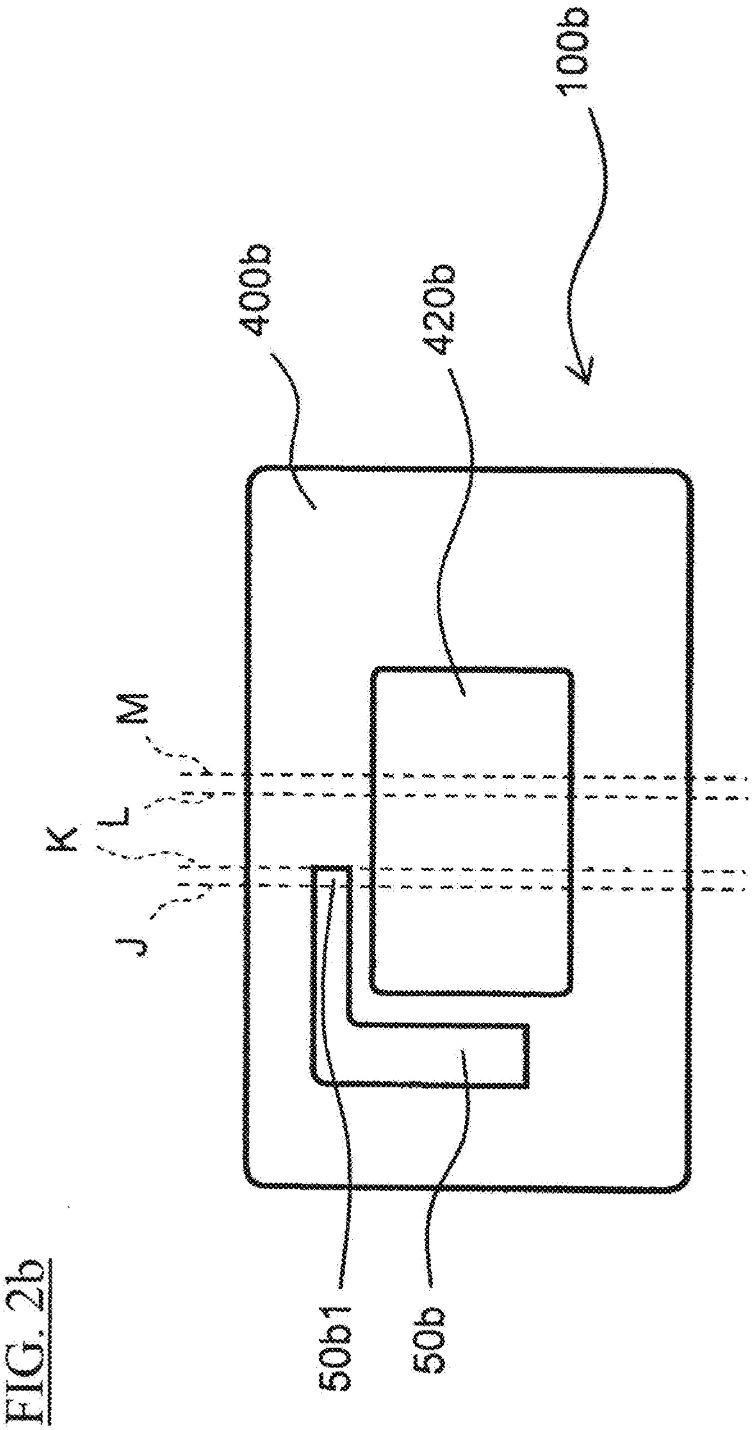

FIG. 2*b* is a diagram for describing a method of manufacturing the multilayer coil shown in FIG. 1A.

Figure 2C:
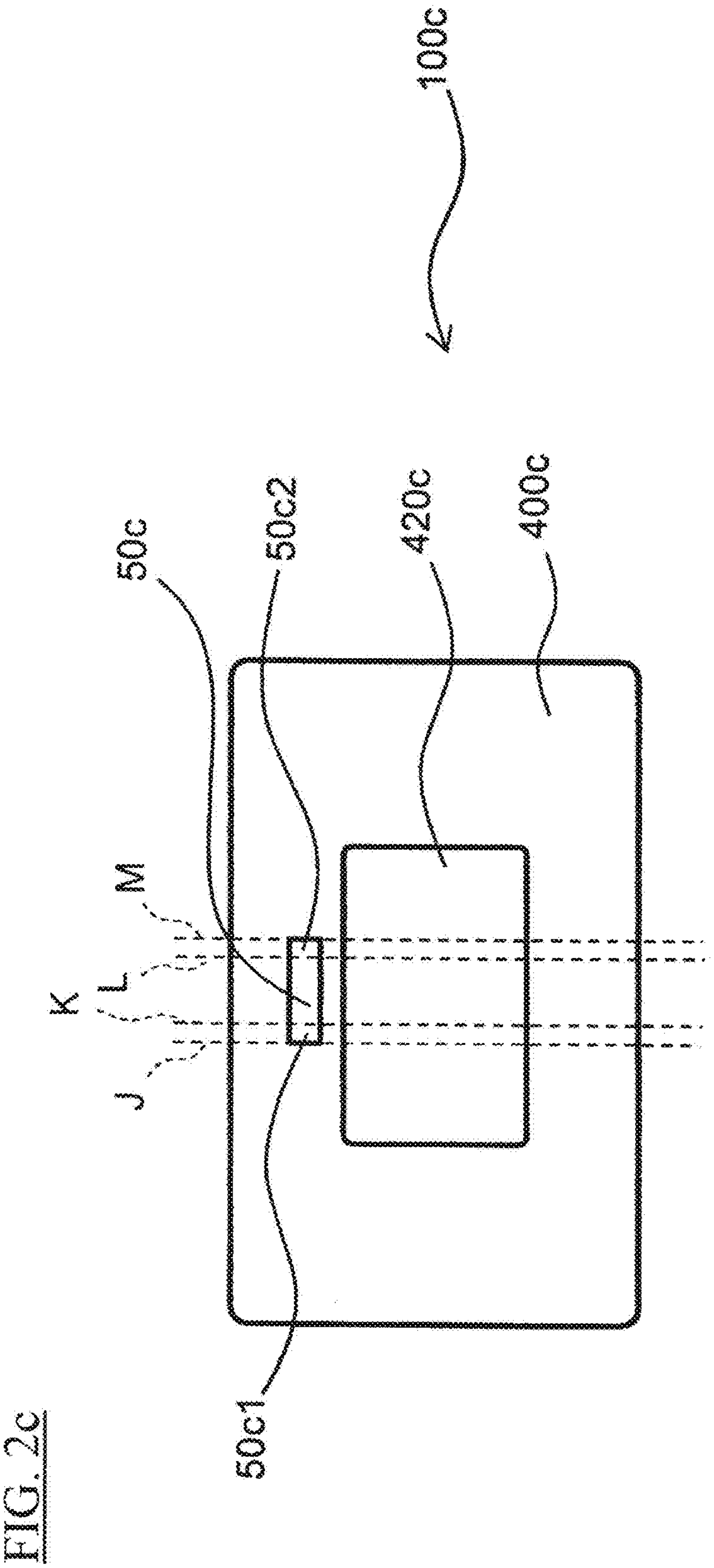

FIG. 2*c* is a diagram for describing a method of manufacturing the multilayer coil shown in FIG. 1A.

Figure 2D:
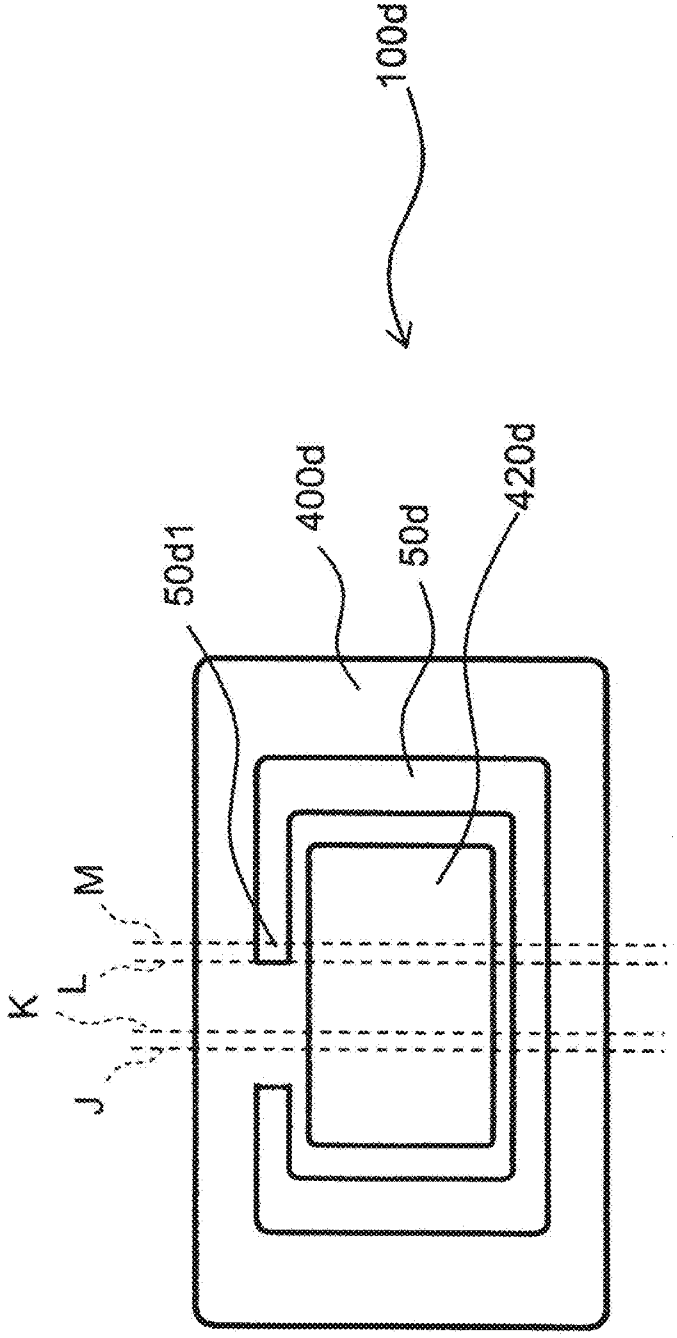

FIG. 2*d* is a diagram for describing a method of manufacturing the multilayer coil shown in FIG. 1A.

Figure 2E:
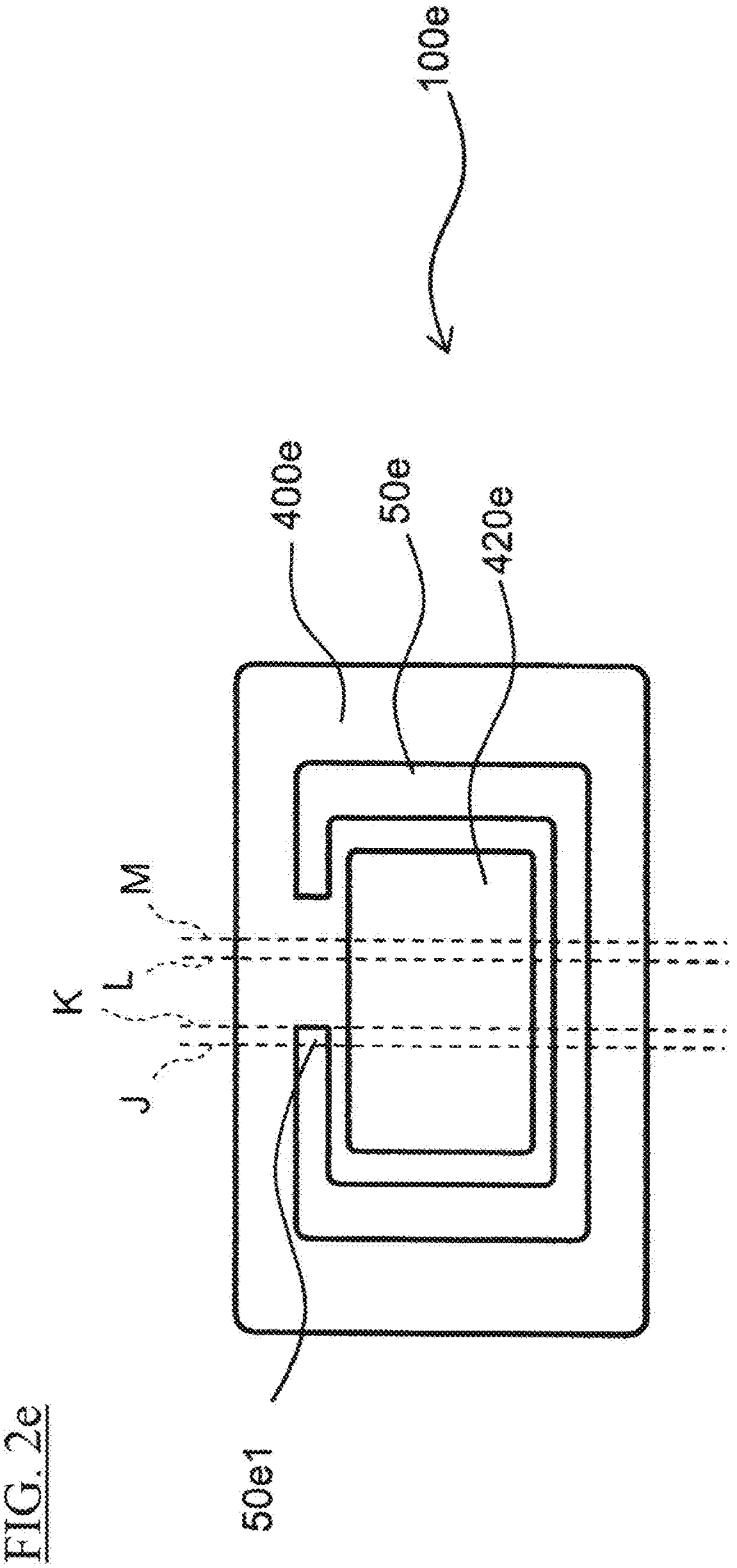

FIG. 2*e* is a diagram for describing a method of manufacturing the multilayer coil shown in FIG. 1A.

Figure 2F:
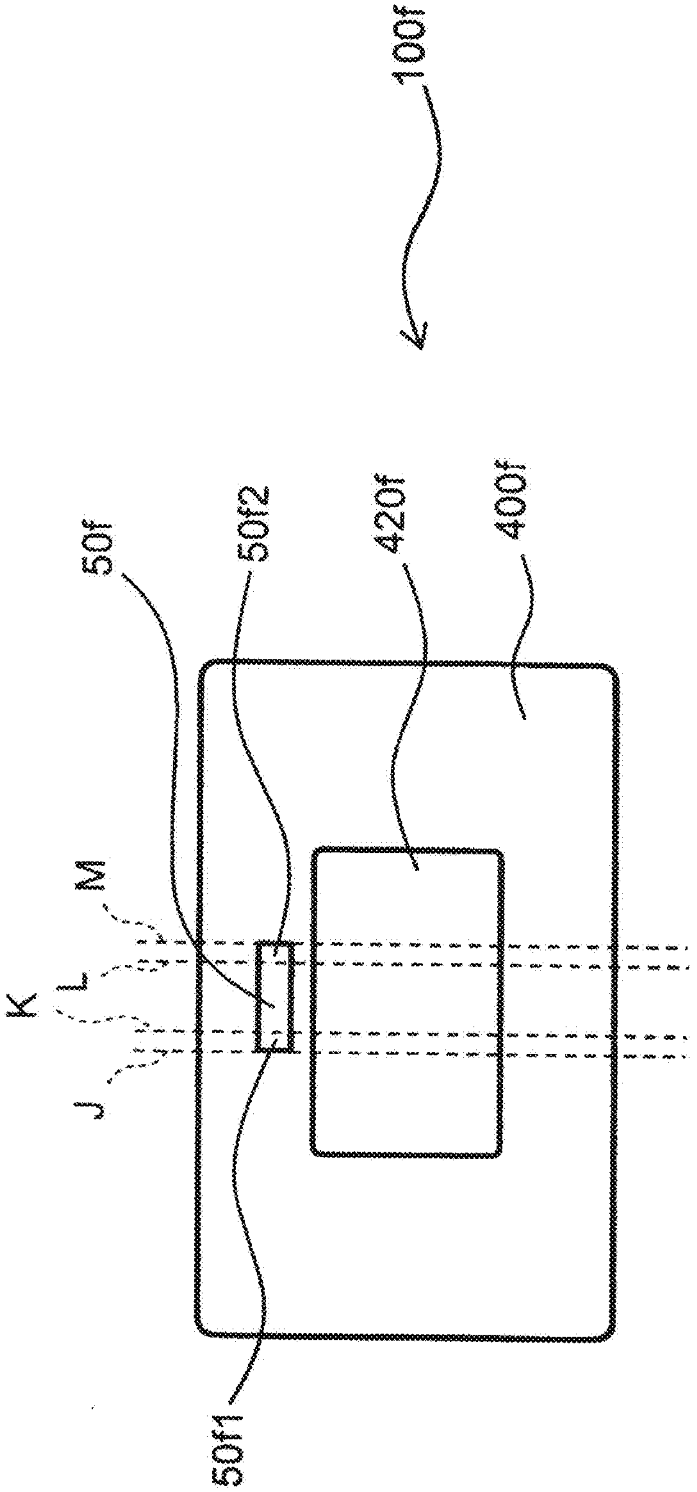

FIG. 2*f* is a diagram for describing a method of manufacturing the multilayer coil shown in FIG. 1A.

Figure 2G:
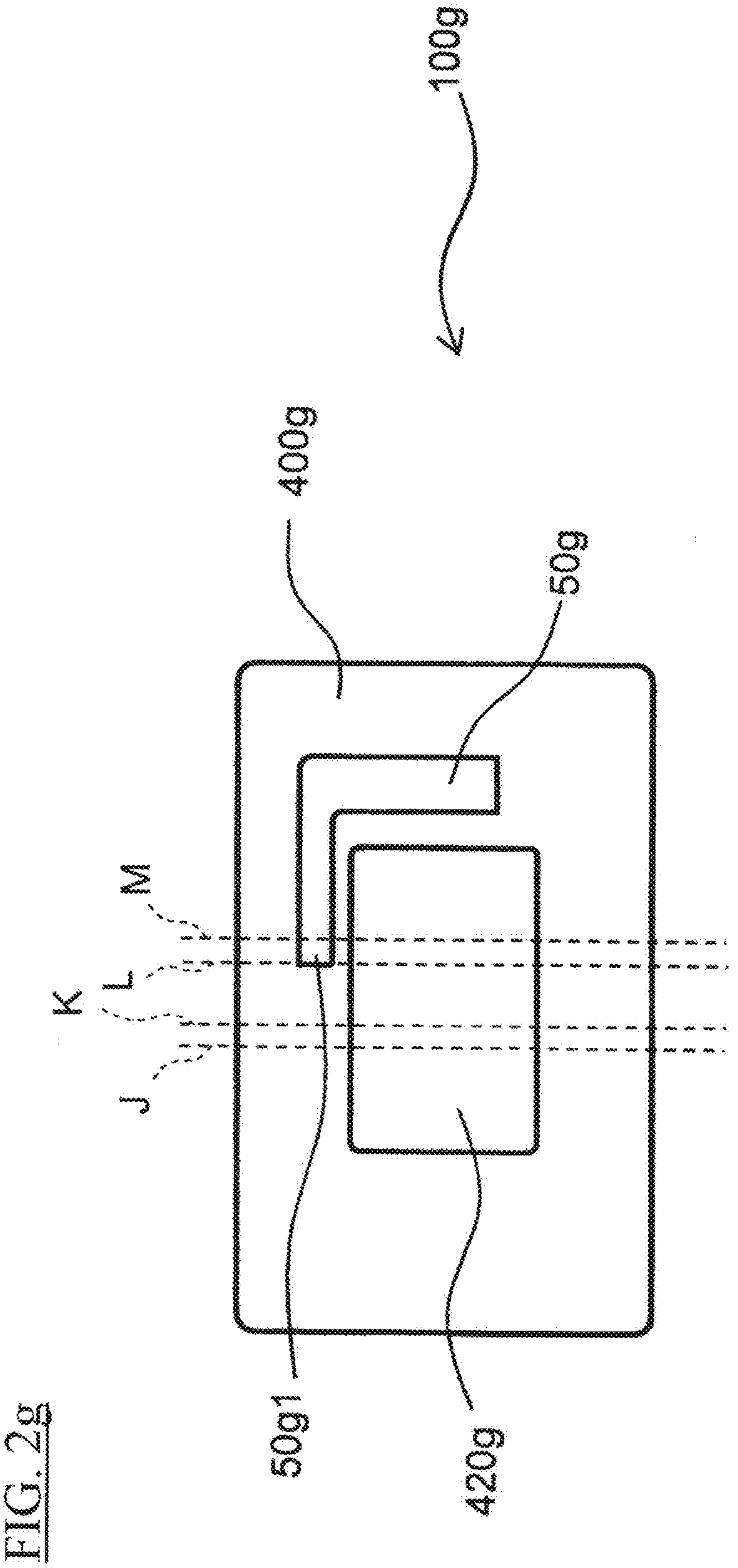

FIG. 2*g* is a diagram for describing a method of manufacturing the multilayer coil shown in FIG. 1A.

Figure 2H:
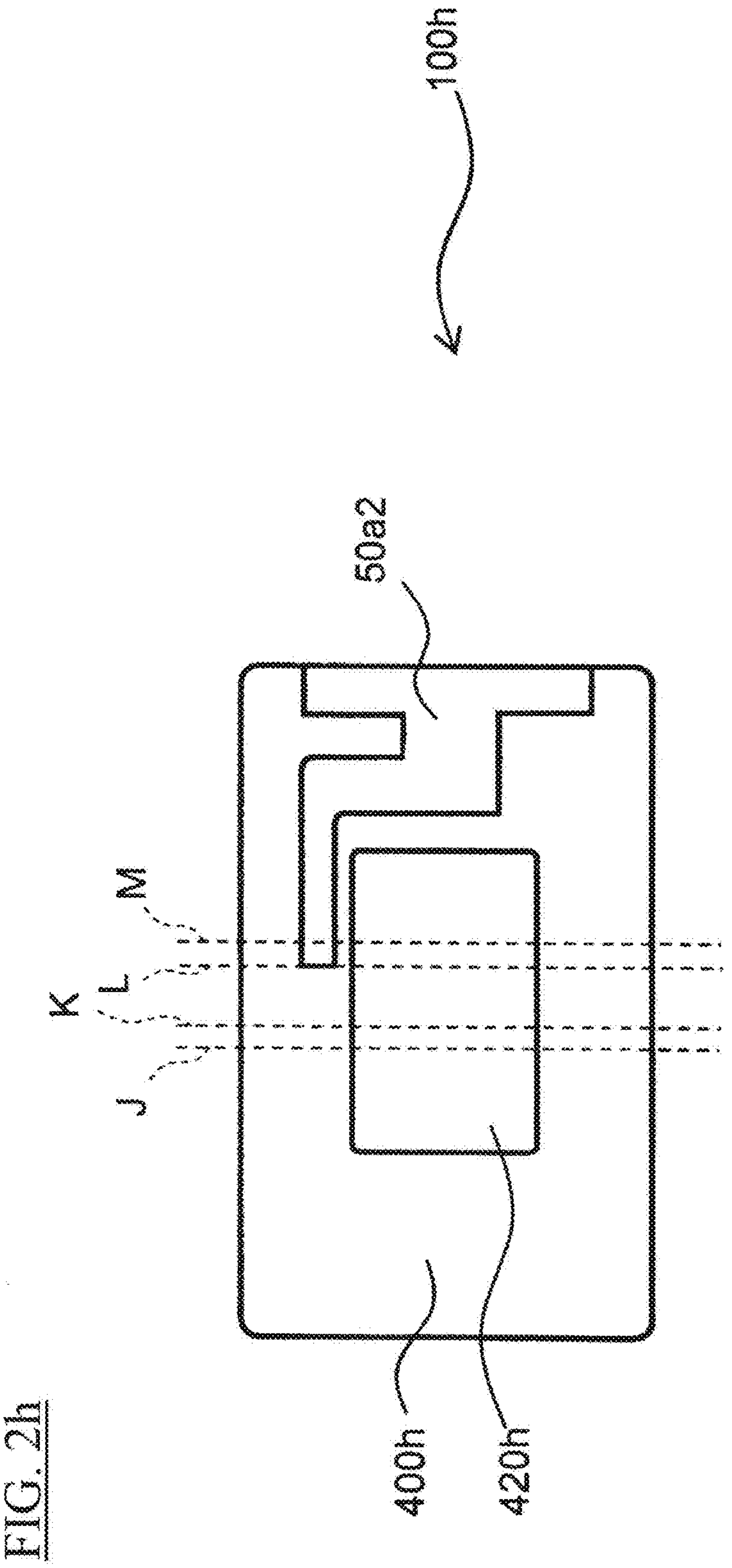

FIG. 2*h* is a diagram for describing a method of manufacturing the multilayer coil shown in FIG. 1A.

Figure 3:
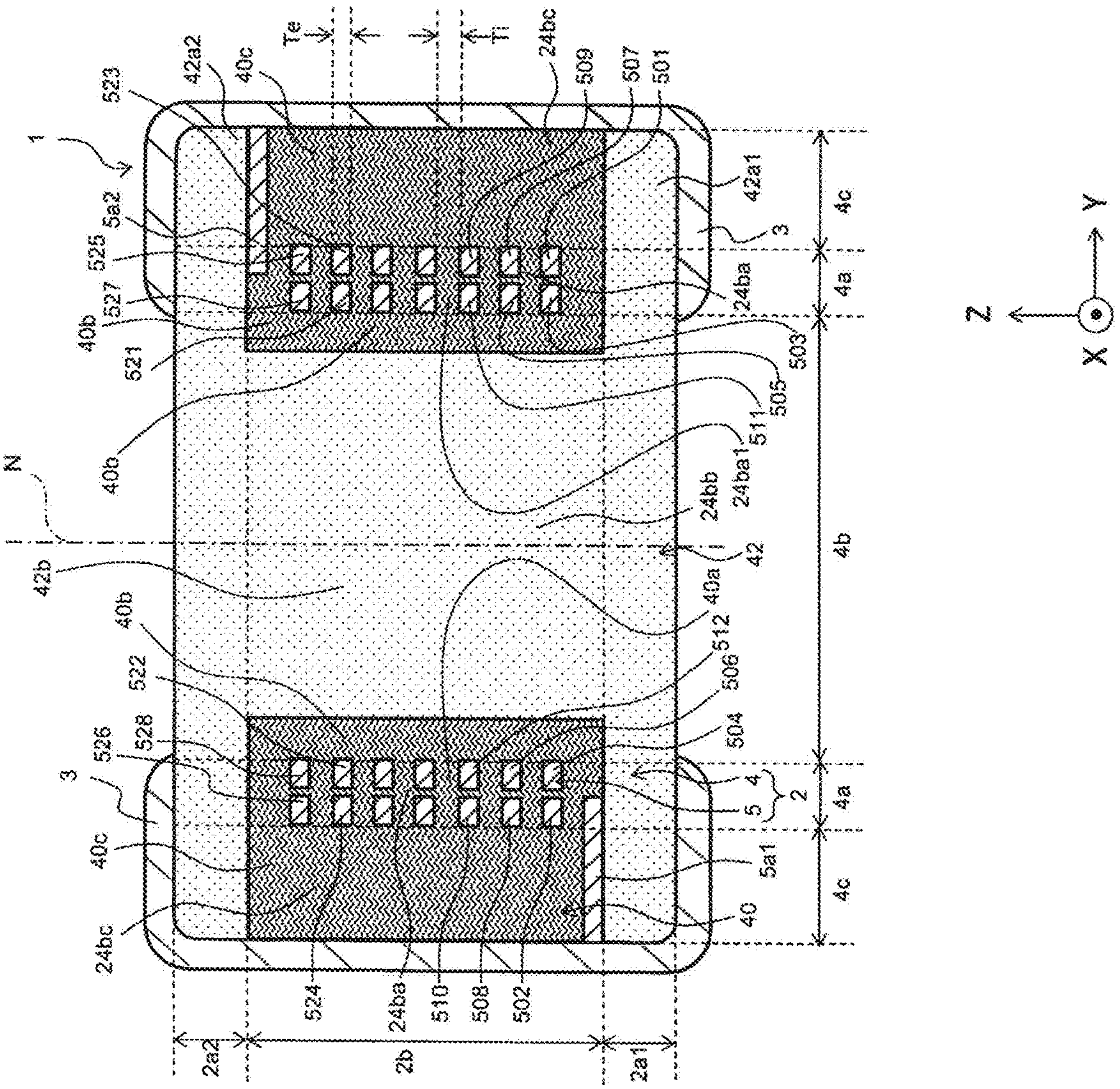

FIG. 3 is a schematic cross-sectional view of a multilayer coil according to another embodiment of the present invention.

Figure 4:
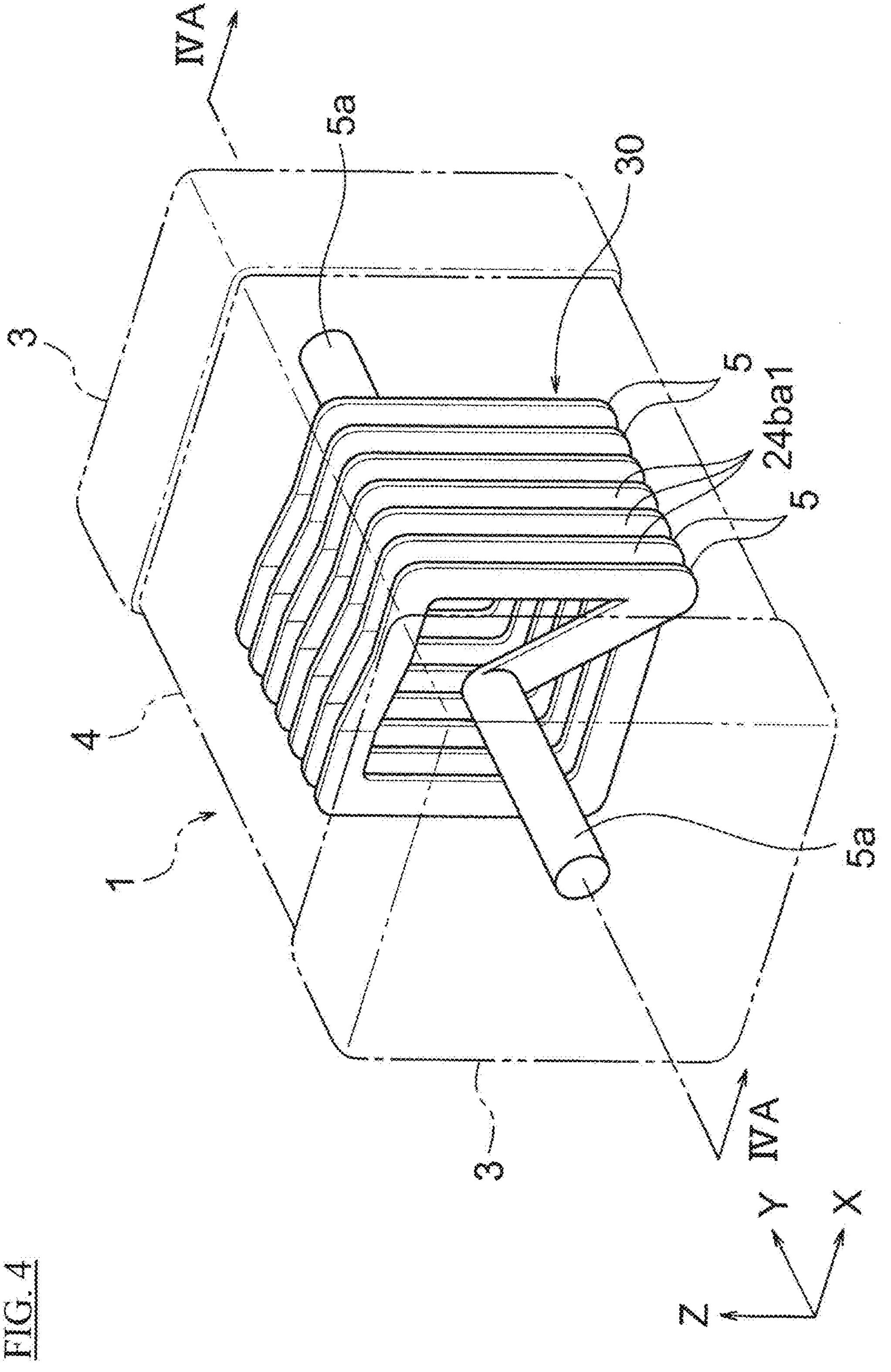

FIG. 4 is a perspective view of a multilayer coil according to another embodiment of the present invention.

Figure 4A:
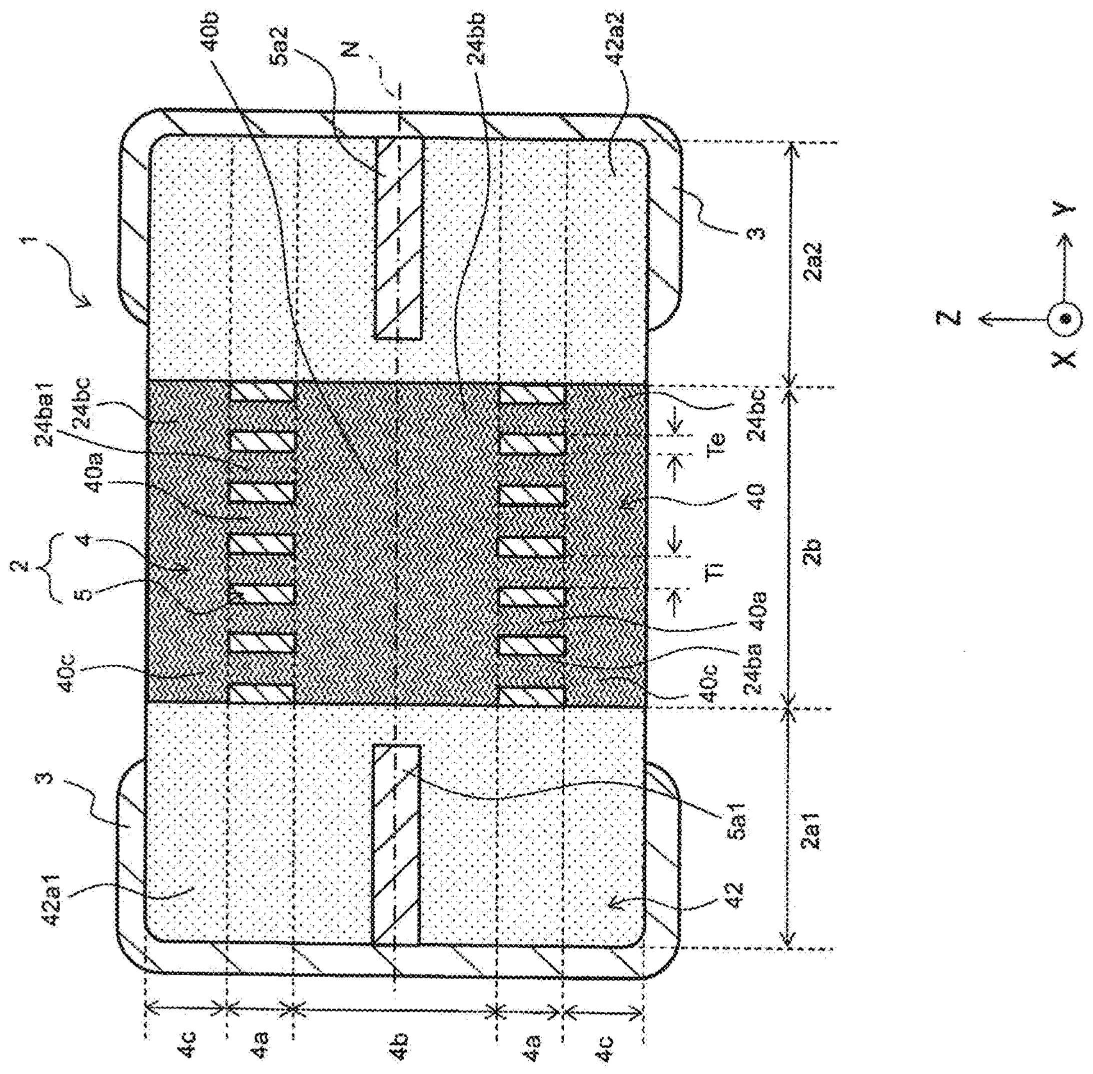

FIG. 4A is a schematic cross-sectional view along the line IVA-IVA in FIG. 4.

Figure 5A:
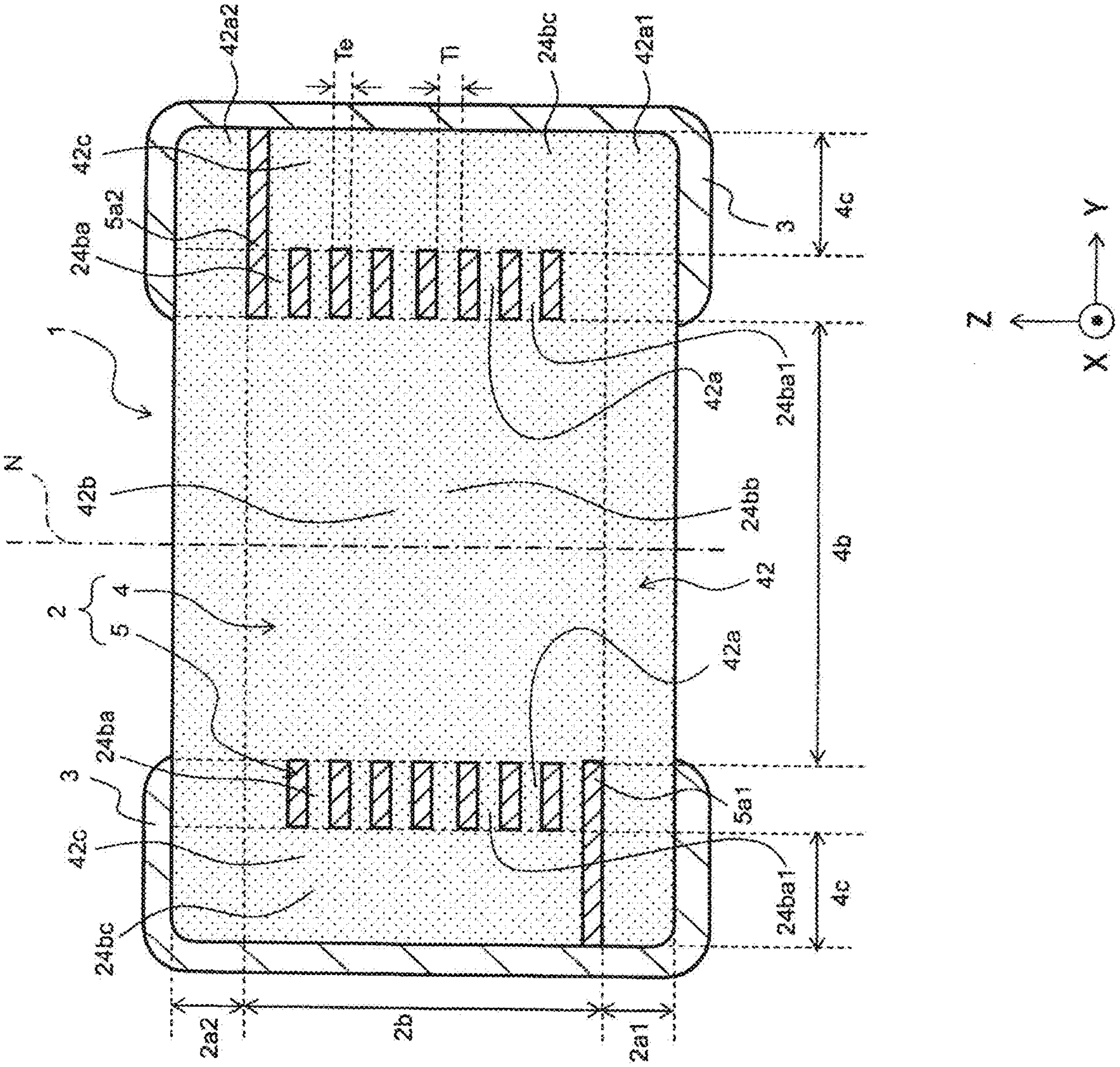

FIG. 5A is a schematic cross-sectional view of a multilayer coil according to a comparative example of the present invention.

Figure 5B:
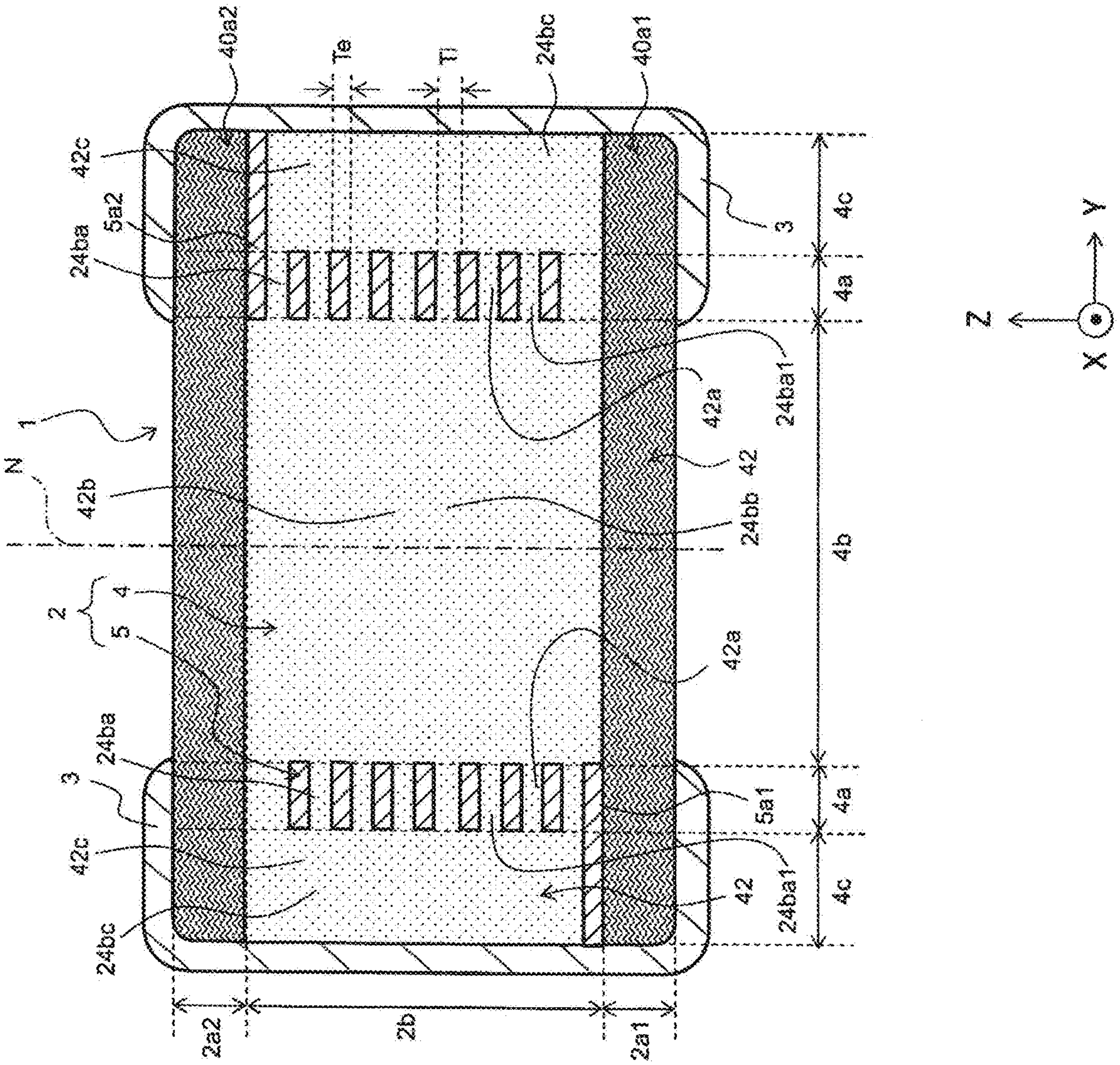

FIG. 5B is a schematic cross-sectional view of a multilayer coil according to a comparative example of the present invention.

Figure 5C:
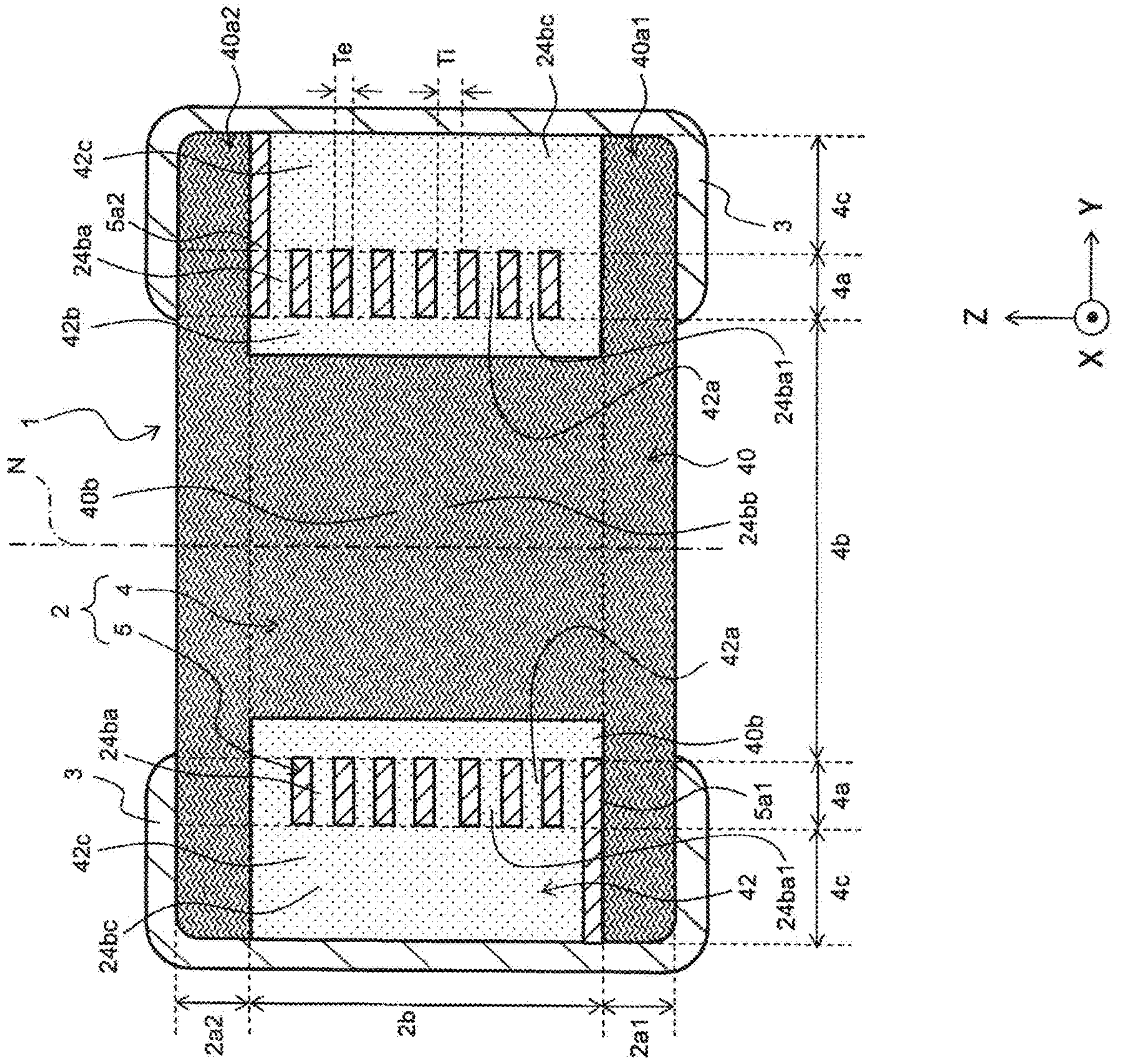

FIG. 5C is a schematic cross-sectional view of a multilayer coil according to a comparative example of the present invention.

Figure 6:
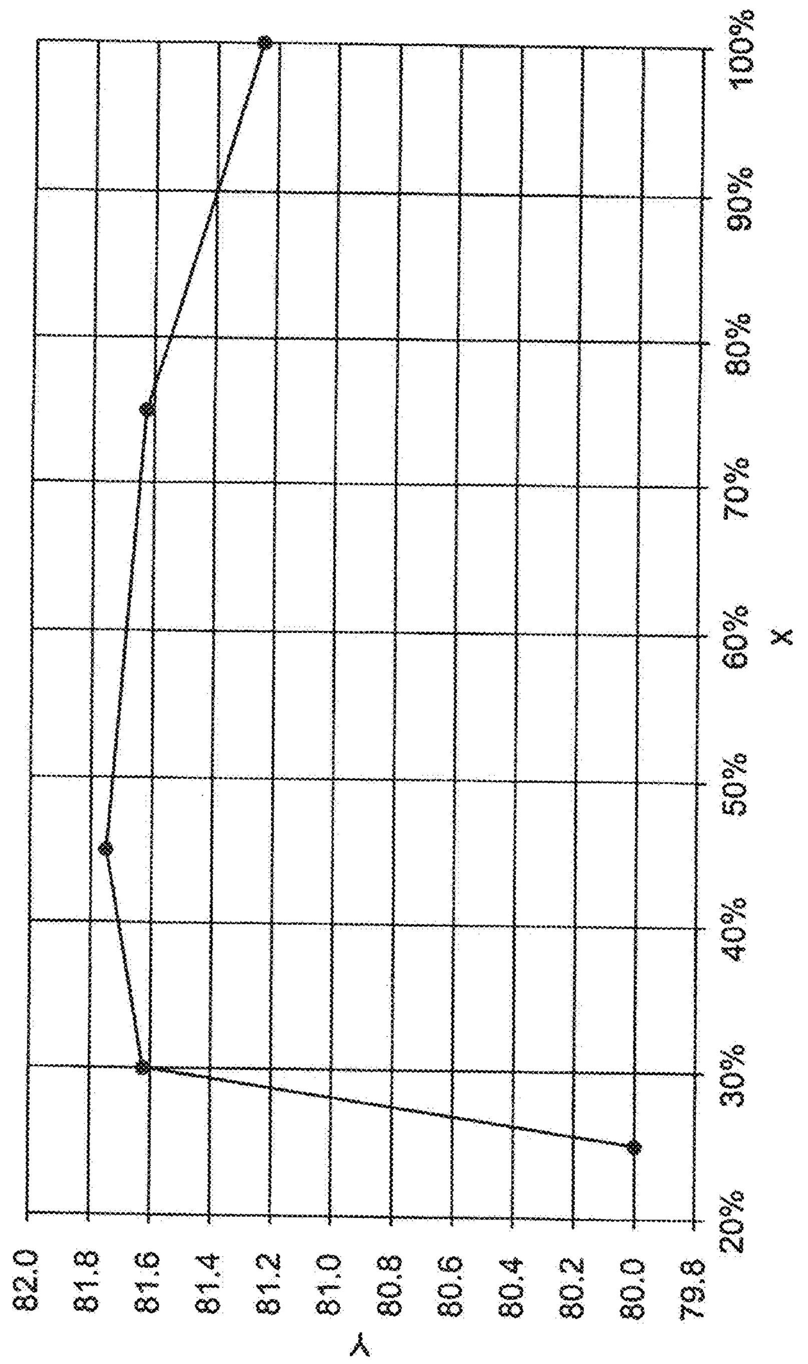

FIG. 6 is a graph with a second inner-diameter magnetic element body proportion (%) on the X-axis and (ΔL/L)+(ΔIdc/Idc) (%) on the Y-axis.

DETAILED DESCRIPTION OF THE INVENTION

First Embodiment

Hereinafter, a multilayer coil 1 shown in FIG. 1 is described as an embodiment of a coil-type electronic component according to the present embodiment.

As shown in FIG. 1 or FIG. 1A, the multilayer coil 1 according to the present embodiment has an element 2 and terminal electrodes 3. In the element 2, a coil conductor 5 is three-dimensionally and spirally embedded inside a magnetic element body 4. The terminal electrodes 3 are formed at both ends of the element 2 and are connected with the coil conductor 5 via leading electrodes 5*a*1 and 5*a*2. In FIG. 1, FIG. 1A, and FIGS. 1B to 1E, 1A1, 3, 4, 4A, and 5A to 5C described later, the X-axis, the Y-axis, and the Z-axis are perpendicular to each other.

In the present embodiment, an "inner side" means a side closer to a center (an axis N of the coil conductor 5) of the multilayer coil 1 whereas an "outer side" means a side farther from the center of the multilayer coil 1.

A material of the terminal electrodes 3 is not limited as long as it is an electrical conductor. For example, Ag, Cu, Au, Al, a Ag alloy, a Cu alloy, or the like is used. Particularly, Ag is preferably used for being inexpensive and having low resistance. The terminal electrodes 3 may include glass frit. The terminal electrodes 3 may also have a two-layered structure having a metal layer that is formed on the element 2 and comprises the above-mentioned metal or the above-mentioned metal and the glass frit, and a resin layer that is formed on the metal layer and comprises a conductive resin. A metal included in the conductive resin is not limited. For example, Ag may be included. Also, surfaces of the terminal electrodes 3 may be plated. For example, Cu, Ni, Sn, Cu—Ni—Sn, and/or Ni—Sn plating may be carried out appropriately.

Materials of the coil conductor 5 and the leading electrodes 5*a*1 and 5*a*2 can be any materials as long as they are electrical conductors. For example, Ag, Cu, Au, Al, a Ag alloy, a Cu alloy, or the like may be used. Particularly, Ag is preferably used for being inexpensive and having low resistance. The coil conductor 5 may include glass frit.

The number of times the coil conductor 5 is wound around its axis N is not limited and is, for example, 1.5 to 15.5 times. The coil conductor 5 may also have any thickness (Te). The thickness is, for example, 5 to 60 μm.

FIG. 1A is a schematic cross-sectional view along the line IA-IA in FIG. 1 and is a cross-sectional view parallel to the Y-Z axis. That is, FIG. 1A is a cross-sectional view in which the leading electrodes 5*a*1 and 5*a*2 and the terminal electrodes 3 can be seen.

As shown in FIG. 1A, the element 2 can be divided into an axis end region 2*a*1, an axis center region 2*b*, and an axis end region 2*a*2, along the winding axis N (parallel to the Z-axis) of the coil conductor 5 from its bottom.

In other words, the element 2 can be divided into the axis center region 2*b*, where the coil conductor 5 is embedded, and the axis end regions 2*a*1 and 2*a*2, where the coil conductor 5 is not embedded, located at the top and the bottom of the axis center region 2*b* in the axis direction (Z-axis direction). The axis direction of the coil conductor 5 is parallel to the lamination direction of the coil conductor 5.

Specifically, regions on the outer side, along the axis N, of an imaginary line that is perpendicular to the axis direction (Z-axis direction) and extends along an outer side of each of the leading electrodes 5*a*1 and 5*a*2 are defined as the axis end regions 2*a*1 and 2*a*2 respectively. A region on the inner side, along the axis N, of each imaginary line is defined as the axis center region 2*b*. In the present embodiment, the axis center region 2*b* is a region including the leading electrodes 5*a*1 and 5*a*2.

The element 2 can also be divided, along the radial direction (Y-axis direction) perpendicular to the axis direction, into an inner diameter region 4*b* of the coil conductor 5, a coil region 4*a* where the coil conductor 5 is wound, and an outer diameter region 4*c* located on an outer side of the radial direction of the coil conductor 5.

In the present embodiment, the element 2 is divided into the axis end regions 2*a*1 and 2*a*2 and the axis center region 2*b* in the Z-axis direction, as well as into the inner diameter region 4*b*, the coil region 4*a*, and the outer diameter region 4*c* in the radial direction, as described above.

Further, in the present embodiment, a region located in both of the axis center region 2*b* and the inner diameter region 4*b* is defined as an axis-center inner-diameter region 24*bb*. A region located in both of the axis center region 2*b* and the coil region 4*a* is defined as an axis-center coil region 24*ba*. A region located in both of the axis center region 2*b* and the outer diameter region 4*c* is defined as an axis-center outer-diameter region 24*bc*.

In the present embodiment, a region located in between adjacent windings of the coil conductor 5 in the axis direction in the axis-center coil region 24*ba* of the element 2 is defined as an interlayer region 24*ba*1. The interlayer region 24*ba*1 may have any thickness (Ti) in the Z-axis direction. The thickness is, for example, 5 to 100 μm.

The magnetic element body 4 according to the present embodiment comprises a first magnetic element body 40 including first soft magnetic metal particles and a second magnetic element body 42 including second soft magnetic metal particles arranged in a predetermined position.

The first magnetic element body 40 comprises a first interlayer magnetic element body 40*a* located in the axis-center coil region 24*ba*, a first inner-diameter magnetic element body 40*b* located in the axis-center inner-diameter region 24*bb*, and a first outer-diameter magnetic element body 40*c* located in the axis-center outer-diameter region 24*bc*, in the present embodiment.

The second magnetic element body 42 comprises second axis-end magnetic element bodies 42*a*1 and 42*a*2 located in the axis end regions 2*a*1 and 2*a*2, a second inner-diameter magnetic element body 42*b* located in the axis-center inner-diameter region 24*bb*, and a second outer-diameter magnetic element body 42*c* mentioned later, located in the axis-center outer-diameter region 24*bc*.

Specifically, as shown in FIG. 1A, the interlayer region 24*ba*1 of the coil conductor 5 comprises the first interlayer magnetic element body 40*a* including the first soft magnetic metal particles.

The first inner-diameter magnetic element body 40*b* is formed continuously from the first interlayer magnetic element body 40*a*. A shape of the first inner-diameter magnetic element body 40*b* is not limited. For example, a shape of a cross section of the first inner-diameter magnetic element body 40*b* is preferably a substantially rectangular shape along the axis center region 2*b*. The "substantially rectangular shape" in the present embodiment means that there may be some irregularities or tilts in the contour of the rectangular shape.

Further, as shown in FIG. 1A, the first outer-diameter magnetic element body 40*c* is formed continuously from the first interlayer magnetic element body 40*a*. A shape of the first outer-diameter magnetic element body 40*c* is not limited. For example, a shape of a cross section of the first outer-diameter magnetic element body 40*c* is a substantially rectangular shape along the axis center region 2*b*.

In the present embodiment, the axis end regions 2*a*1 and 2*a*2 on the outer side along the coil conductor 5 comprise the second axis-end magnetic element bodies 42*a*1 and 42*a*2 respectively.

The second magnetic element body 42 may comprise a region other than the axis end regions 2*a*1 and 2*a*2. For example, as shown in FIG. 1A, the second inner-diameter magnetic element body 42*b* partly constituting the axis-center inner-diameter region 24*bb* of the coil conductor 5 may be included, continuously from the second axis-end magnetic element bodies 42*a*1 and 42*a*2. In other words, the second inner-diameter magnetic element body 42*b* may constitute the inner side of the first inner-diameter magnetic element body 40*b* in the axis-center inner-diameter region 24*bb*. A shape of a cross section of the second inner-diameter magnetic element body 42*b* is preferably a substantially rectangular shape along the axis center region 2*b*.

While the above description was provided along the Y-Z cross sectional view shown in FIG. 1A, any cross section with the axis N of the coil conductor 5 included has the same structure. For example, a Z-X cross sectional view has the same structure.

FIG. 1A1 is a cross-sectional view along the line IAI-IAI in FIG. 1. That is, FIG. 1A1 is a cross-sectional view perpendicular to the axis N of the coil conductor 5, cut in the axis center region 2*b*. In the cross section perpendicular to the axis N of the coil conductor 5 in the axis center region 2*b*, a boundary between the axis-center coil region 24*ba* and the axis-center inner-diameter region 24*bb* is shown in a dashed line as an inner-diameter boundary line R. Also, a boundary between the axis-center coil region 24*ba* and the axis-center outer-diameter region 24*bc* is shown in a dashed-and-dotted line as an outer-diameter boundary line S. Because the windings of the coil conductor 5 are stacked spirally, in the cross section perpendicular to the axis direction, the coil conductor 5 is not positioned in a part of the axis-center coil region 24*ba*, and a second interlayer magnetic element body 42*a* is positioned instead, as shown in FIG. 1A1. That is, where the second interlayer magnetic element body 42*a* is positioned is the interlayer region 24*ba*1.

In the cross section perpendicular to the axis N of the coil conductor 5 in the axis center region 2*b* of the present embodiment, the proportion (hereinafter referred to as a "second inner-diameter magnetic element body proportion") of the area of the second inner-diameter magnetic element body 42*b* in the area of the axis-center inner-diameter region 24*bb* is preferably 30% or more and is more preferably 30% to 75%. In the cross section perpendicular to the axis N of the coil conductor 5 in the axis center region 2*b* of the present embodiment, the axis-center inner-diameter region 24*bb* is a region on the inner side of the inner-diameter boundary line R.

Also, in the cross section perpendicular to the axis N of the coil conductor 5 in the axis center region 2*b*, the proportion (hereinafter referred to as a "second outer-diameter magnetic element body proportion") of the area of the second outer-diameter magnetic element body 42*c* in the area of the axis-center outer-diameter region 24*bc* is preferably 15% or more and is more preferably 15% to 50%. In the cross section perpendicular to the axis N of the coil conductor 5 in the axis center region 2*b* of the present embodiment, the axis-center outer-diameter region 24*bc* is a region on the outer side of the outer-diameter boundary line S.

In the present embodiment, the first soft magnetic metal particles have a higher saturation magnetization (Ms) than that of the second soft magnetic metal particles. When the saturation magnetization of the first soft magnetic metal particles and the saturation magnetization of the second soft magnetic metal particles are defined as "first Ms" and "second Ms" respectively, (first Ms/second Ms) is preferably 1.07 to 1.80 and more preferably 1.16 to 1.50. Hereinafter, the first soft magnetic metal particles and the second soft magnetic metal particles may be collectively referred to as "soft magnetic metal particles."

A material of the first soft magnetic metal particles according to the present embodiment is not limited. The material is, for example, an Fe—Si-based alloy, an Fe—Si—Cr-based alloy, pure Fe, an Fe—Ni-based alloy, or an Fe—Si—Al-based alloy, and is preferably the Fe—Si-based alloy. This makes it possible to further increase the saturation magnetization of the first soft magnetic metal particles.

The amount of Fe in each of the first soft magnetic metal particles is preferably 92.0 to 97.0 mass % and more preferably 92.5 to 96.5 mass % in 100 mass % of the total amount of Fe and Si in the first soft magnetic metal particle.

The amount of Cr in the first soft magnetic metal particle is preferably 5 mass % or less and more preferably less than 2 mass % in 100 mass % of the total amount of Fe and Si in the first soft magnetic metal particle. This ensures a better balance between inductance and DC superimposition characteristic, further raises evaluation of prevention of plating elongation, and further decreases the number of short circuits.

The amount of P in the first soft magnetic metal particle is preferably 10 to 700 ppm and more preferably 40 to 650 ppm in 100 mass % of the total amount of Fe and Si in the first soft magnetic metal particle. This ensures a better balance between inductance and DC superimposition characteristic, further raises evaluation of prevention of plating elongation, and further decreases the number of short circuits.

The amount of a chemical element other than Fe, Si, Cr, and P in the first soft magnetic metal particle is preferably less than 3 mass % in 100 mass % of the total amount of Fe and Si in the first soft magnetic metal particle. The chemical element other than Fe, Si, Cr, and P in the first soft magnetic metal particle is, for example, Ni, O, Co, or Al.

A material of the second soft magnetic metal particles according to the present embodiment is not limited. The material is, for example, an Fe—Ni-based alloy, an Fe—Si—Cr-based alloy, or an Fe—Si—Al-based alloy, and is preferably the Fe—Ni-based alloy. It is thus easier to increase the saturation magnetization of the first soft magnetic metal particles compared to the saturation magnetization of the second soft magnetic metal particles, which can improve inductance and DC superimposition characteristic sufficiently.

The amount of Fe in each of the second soft magnetic metal particles is preferably 33.0 to 68.0 mass % and more preferably 37.0 to 55.0 mass % in 100 mass % of the total amount of Fe, Ni, Si, Co, Cr, and P in the second soft magnetic metal particle.

The amount of Ni in the second soft magnetic metal particle is preferably 14.0 to 56.0 mass % and more preferably 15.0 to 55.0 mass % in 100 mass % of the total amount of Fe, Ni, Si, Co, Cr, and P in the second soft magnetic metal particle. This ensures a better balance between inductance and DC superimposition characteristic, further raises evaluation of prevention of plating elongation, and further decreases the number of short circuits.

The amount of Si in the second soft magnetic metal particle is preferably 2.0 to 6.0 mass % in 100 mass % of the total amount of Fe, Ni, Si, Co, Cr, and P in the second soft magnetic metal particle. This ensures a better balance between inductance and DC superimposition characteristic, further raises evaluation of prevention of plating elongation, and further decreases the number of short circuits.

The amount of Co in the second soft magnetic metal particle is preferably 2.0 to 40.0 mass % in 100 mass % of the total amount of Fe, Ni, Si, Co, Cr, and P in the second soft magnetic metal particle. This ensures a better balance between inductance and DC superimposition characteristic, further raises evaluation of prevention of plating elongation, and further decreases the number of short circuits.

The amount of Cr in the second soft magnetic metal particle is preferably 1.8 mass % or less in 100 mass % of the total amount of Fe, Ni, Si, Co, Cr, and P in the second soft magnetic metal particle. This ensures a better balance between inductance and DC superimposition characteristic.

The amount of P in the second soft magnetic metal particle is preferably 10 to 6000 ppm and more preferably 100 to 5000 ppm in 100 mass % of the total amount of Fe, Ni, Si, Co, Cr, and P in the second soft magnetic metal particle. This ensures a better balance between inductance and DC superimposition characteristic, further raises evaluation of prevention of plating elongation, and further decreases the number of short circuits.

The amount of a chemical element other than Fe, Ni, Si, Co, Cr, and P in the second soft magnetic metal particle is preferably less than 3 mass % in 100 mass % of the total amount of Fe, Ni, Si, Co, Cr, and P in the second soft magnetic metal particle. The chemical element other than Fe, Ni, Si, Co, Cr, and P in the second soft magnetic metal particle is, for example, Al or O.

The first soft magnetic metal particles according to the present embodiment preferably have an average particle size of 1 to 6 μm. When the average particle size of the first soft magnetic metal particles is 1 to 6 μm, inductance can be increased compared to when the average particle size of the first soft magnetic metal particles is smaller than 1 μm. Also, when the average particle size of the first soft magnetic metal particles is 1 to 6 μm, it is possible to increase inductance compared to when the average particle size of the first soft magnetic metal particles exceeds 6 μm, prevent plating elongation, and reduce the number of short circuits.

The second soft magnetic metal particles according to the present embodiment preferably have an average particle size of 1 to 15 μm. When the average particle size of the second soft magnetic metal particles is 1 to 15 μm, inductance can be increased compared to when the average particle size of the second soft magnetic metal particles is smaller than 1 μm. Also, when the average particle size of the second soft magnetic metal particles is 1 to 15 μm, it is possible to improve DC superimposition characteristic compared to when the average particle size of the second soft magnetic metal particles exceeds 15 μm, prevent plating elongation, and reduce the number of short circuits.

The average particle size of the first soft magnetic metal particles is preferably equivalent to or smaller than the average particle size of the second soft magnetic metal particles. When the average particle size of the first soft magnetic metal particles and the average particle size of the second soft magnetic metal particles are defined as a "first average particle size" and a "second average particle size" respectively, (first average particle size/second average particle size) is preferably 0.2 to 1.0 and more preferably 0.2 to 0.5.

A method of measuring the average particle size of the soft magnetic metal particles is not limited. In the present embodiment, the average particle size is calculated as follows. A cross section of the multilayer coil 1 (electronic component) filled with a resin is observed with SEM, STEM, etc., and the area of each soft magnetic metal particle is calculated through an image analysis. A value (area diameter) calculated as a diameter (circle equivalent diameter) of a circle corresponding to the area is defined as a particle size of the soft magnetic metal particle. An average of the diameters of multiple soft magnetic metal particles is defined as the average particle size.

Shapes of the soft magnetic metal particles are not limited.

The magnetic element body 4 according to the present embodiment includes the soft magnetic metal particles connected to each other through firing. Specifically, a chemical element included in the soft magnetic metal particles that came into contact with each other through firing react with another chemical element (e.g., 0), and the soft magnetic metal particles connect with each other through bonding attributable to the reaction. In the magnetic element body 4 according to the present embodiment, the soft magnetic metal particles derived from a soft magnetic metal powder (raw material powder of the soft magnetic metal particles) connect with each other through the heat treatment. However, particle growth of each soft magnetic metal particle hardly occurs.

The amount of the first soft magnetic metal particles in the first magnetic element body 40 is preferably 90 mass % or more and is more preferably 95 mass % or more. As long as at least the above-mentioned amount of the first soft magnetic metal particles is included in the first magnetic element body 40, the first magnetic element body 40 does not have to be comprised entirely of the first soft magnetic metal particles. For example, the first magnetic element body 40 may include some metal particles with the saturation magnetization equivalent to or smaller than that of the second soft magnetic metal particles.

The amount of the second soft magnetic metal particles in the second magnetic element body 42 is preferably 90 mass % or more and is more preferably 95 mass % or more. As long as at least the above-mentioned amount of the second soft magnetic metal particles is included in the second magnetic element body 42, the second magnetic element body 42 does not have to be comprised entirely of the second soft magnetic metal particles and may include, for example, some metal particles with the saturation magnetization equivalent to or larger than that of the first soft magnetic metal particles.

Each of the soft magnetic metal particles may be covered with a coverage film. Specifically, the coverage film may be an oxide film, which may include a layer comprising a Si-containing oxide. With the coverage film covering the soft magnetic metal particle, insulating properties among the soft magnetic metal particles are increased, which improves a Q factor. Also, with the layer comprising the Si-containing compound included in the oxide film, formation of an Fe oxide can be prevented.

A method of determining regions of the first magnetic element body 40 and the second magnetic element body 42 of the element 2 according to the present embodiment is not limited. The regions may be determined by, for example, obtaining an elemental mapping with EDS and performing a composition analysis.

Because the compositions of the first magnetic element body 40 and the second magnetic element body 42 are different, by performing an image analysis of a cross section of the element 2 with SEM, STEM, etc., it is possible to determine the regions of the first magnetic element body 40 and the second magnetic element body 42 based on their contrast. Further, if the average particle sizes of the first soft magnetic metal particles and the second soft magnetic metal particles are different, it is easier to determine the regions of the first magnetic element body 40 and the second magnetic element body 42 based on their contrast, by performing the image analysis of the cross section of the element 2 with SEM, STEM, etc.

In the present embodiment, a set of raw materials of the first soft magnetic metal particles may be referred to as a "first soft magnetic metal powder," a set of raw materials of the second soft magnetic metal particles may be referred to as a "second soft magnetic metal powder," and a set of raw materials of the soft magnetic metal particles may be referred to as a "soft magnetic metal powder." That is, the set of the raw materials of the first soft magnetic metal particles and the second soft magnetic metal particles may be collectively referred to as the "soft magnetic metal powder."

Hereinafter, a method of manufacturing the first soft magnetic metal powder and the second soft magnetic metal powder according to the present embodiment is described.

In the present embodiment, a simple substance or an alloy of a constituent chemical element may be used as a raw material of the first soft magnetic metal powder. For example, Fe alone, Si alone, Cr alone, etc. may be used.

Also, an alloy or a simple substance of a constituent chemical element may be used as a raw material of the second soft magnetic metal powder. For example, an Fe—Ni alloy, Fe alone, Ni alone, Si alone, Co alone, Cr alone, etc. may be used.

In the present embodiment, the soft magnetic metal powder can be obtained using a method of manufacturing a known soft magnetic metal powder. Specifically, the soft magnetic metal powder can be manufactured with a gas atomizing method, a water atomizing method, a rotating disk method, etc. Among these, the water atomizing method is preferably used from a perspective of easily obtaining the soft magnetic metal powder having desirable magnetic properties.

In using the water atomizing method, the raw materials having an ingot, a chunk, or a shot shape are prepared, mixed together to have a desired composition, and then placed in a crucible provided in a water atomizing device.

Then, in an inert atmosphere, the crucible is heated to 1600° C. or more through high-frequency induction using a work coil arranged outside the crucible. The ingots, chunks, or shots in the crucible are thus melted and mixed, and a molten metal is obtained.

The melted material (molten metal) is supplied as a linear continuous fluid through a nozzle provided at a bottom of the crucible. Water is sprayed to the supplied molten metal at a high pressure (about 50 MPa), and the molten metal is formed into droplets. At the same time, the molten metal is rapidly cooled, then dehydrated, dried, and classified, so as to obtain the soft magnetic metal powder having a desired average particle size.

In the present embodiment, for example, the soft magnetic metal powder according to the present embodiment can be manufactured in such a manner that each raw material is melted, P is added to this molten material, and then the water atomizing method is used to turn the molten material with P into a fine powder. When P is included as an impurity in the raw material (e.g., the raw material of Fe), a total of the amount of P as the impurity and the amount of P added may be controlled to manufacture the soft magnetic metal powder including an intended amount of P. Alternatively, a plurality of materials of Fe each including a different amount of P may be used for turning the molten material including an adjusted amount of P into a fine powder using the water atomizing method.

In the present embodiment, the first soft magnetic metal powder (raw material powder of the first soft magnetic metal particles) and the second soft magnetic metal powder (raw material powder of the second soft magnetic metal particles) are each prepared using the above-mentioned method.

Next, a method of manufacturing the multilayer coil 1 shown in FIGS. 1, 1A, and 1A1 is described. First, the obtained first soft magnetic metal powder is turned into slurry with an additive, such as a solvent and a binder, to prepare a first paste. In the same manner, the obtained second soft magnetic metal powder is turned into slurry with an additive, such as a solvent and a binder, to prepare a second paste.

Then, using the second paste, a second axis-end green sheet is formed which becomes the second axis-end magnetic element body **42*a*1 constituting the axis end region 2*a*1** after firing.

Next, on the second axis-end green sheet, a conductor **50*a*1, a first green sheet 400*a* made from the first paste, and a second green sheet 420*a* made from the second paste are printed in a form of a printed body 100*a* shown in FIG. 2*a***.

The conductor **50*a*1 and a conductor 50*a*2 mentioned later are conductors comprising silver (Ag) or the like that become the leading electrodes 5*a*1 and 5*a*2 of the coil conductor 5 after firing. Each of the first green sheet 400*a* and first green sheets 400*b* to 400*h* mentioned later becomes the first magnetic element body 40 after firing. Each of the second green sheet 420*a* and second green sheets 420*b* to 420*h* mentioned later becomes the second magnetic element body 42 after firing. Consequently, in the step shown in FIG. 2*a*, the second green sheet 420*a*** is formed so that a desired second inner-diameter magnetic element body proportion is achieved after firing.

Next, a conductor 50*b*, the first green sheet 400*b* made from the first paste, and the second green sheet 420*b* made from the second paste are printed in a form of a printed body 100*b* shown in FIG. 2*b* on the printed body 100*a* shown in FIG. 2*a*. That is, in the printed body shown in FIG. 2*b*, the conductor 50*b* is printed so that it connects with the conductor 50*a*1, and the second green sheet 420*b* is printed so that it lies on the second green sheet 420*a* shown in FIG. 2*a*.

The conductor 50*b* and conductors 50*c* to 50*g* mentioned later are conductors comprising silver (Ag) or the like that become the coil conductor 5 after firing.

Next, the conductor 50*c*, the first green sheet 400*c* made from the first paste, and the second green sheet 420*c* made from the second paste are printed in a form of a printed body 100*c* shown in FIG. 2*c* on the printed body 100*b* shown in FIG. 2*b*. That is, the conductor 50*c* is printed so that a part (a conductor 50*c*1) of the conductor 50*c* connects with a part (50*b*1) of the conductor 50*b*, and the second green sheet 420*c* is printed so that it lies on the second green sheet 420*b* shown in FIG. 2*b*.

Next, the conductor 50*d*, the first green sheet 400*d* made from the first paste, and the second green sheet 420*d* made from the second paste are printed in a form of a printed body 100*d* shown in FIG. 2*d* on the printed body 100*c* shown in FIG. 2*c*. That is, the conductor 50*d* is printed so that a part (a conductor 50*d*1) of the conductor 50*d* connects with a part (50*c*2) of the conductor 50*c*, and the second green sheet 420*d* is printed so that it lies on the second green sheet 420*c* shown in FIG. 2*c*.

Next, the conductor 50*e*, the first green sheet 400*e* made from the first paste, and the second green sheet 420*e* made from the second paste are printed in a form of a printed body 100*e* shown in FIG. 2*e* on the printed body 100*d* shown in FIG. 2*d*. That is, the conductor 50*e* is printed so that it connects with the conductor 50*d*, and the second green sheet 420*e* is printed so that it lies on the second green sheet 420*d* shown in FIG. 2*d*.

Next, the conductor 50*f*, the first green sheet 400*f* made from the first paste, and the second green sheet 420*f* made from the second paste are printed in a form of a printed body 100*f* shown in FIG. 2*f* on the printed body 100*e* shown in FIG. 2*e*. That is, the conductor 50*f* is printed so that a part (a conductor 50*f*1) of the conductor 50*f* connects with a part (50*e*1) of the conductor 50*e*, and the second green sheet 420*f* is printed so that it lies on the second green sheet 420*e* shown in FIG. 2*e*.

Then, printing shown in FIG. 2*d* to FIG. 2*f* is repeated. After that, the conductor 50*g*, the first green sheet 400*g* made from the first paste, and the second green sheet 420*g* made from the second paste are printed in a form of a printed body 100*g* shown in FIG. 2*g* on the printed body 100*f* shown in FIG. 2*f*. That is, the conductor 50*g* is printed so that a part (a conductor 50*g*1) of the conductor 50*g* connects with a part (50*f*2) of the conductor 50*f*, and the second green sheet 420*g* is printed so that it lies on the second green sheet 420*f* shown in FIG. 2*f*.

Next, the conductor 50*a*2, the first green sheet 400*h* made from the first paste, and the second green sheet 420*h* made from the second paste are printed in a form of a printed body 100*h* shown in FIG. 2*h* on the printed body 100*g* shown in FIG. 2*g*. That is, the conductor 50*a*2 is printed so that it connects with the conductor 50*g*, and the second green sheet 420*h* is printed so that it lies on the second green sheet 420*g* shown in FIG. 2*g*.

In each of FIG. 2*a* to FIG. 2*h*, an order of printing the conductor, the first green sheet, and the second green sheet on the same plane is not limited.

Further, using the second paste, on the printed body 100*h* shown in FIG. 2*h*, a second axis-end green sheet is formed which becomes the second axis-end magnetic element body 42*a*2 constituting the axis end region 2*a*2 after firing.

In a multilayer body obtained in this way, first, the conductor 50*a*1 of the printed body 100*a* shown in FIG. 2*a* and the conductor 50*b* of the printed body 100*b* shown in FIG. 2*b* are in contact with each other to a wide extent and are electrically connected.

The 50*b*1 of the conductor 50*b* of the printed body 100*b* shown in FIG. 2*b* and the 50*c*1 of the conductor 50*c* of the printed body 100*c* shown in FIG. 2*c* are areas sandwiched between imaginary lines J and K. The regions are physically connected with each other and are thus electrically connected.

The 50*c*2 of the conductor 50*c* of the printed body 100*c* shown in FIG. 2*c* and the 50*d*1 of the conductor 50*d* of the printed body 100*d* shown in FIG. 2*d* are areas sandwiched between imaginary lines L and M. The regions are physically connected with each other and are thus electrically connected.

The conductor 50*d* of the printed body 100*d* shown in FIG. 2*d* and the conductor 50*e* of the printed body 100*e* shown in FIG. 2*e* are in contact with each other to a wide extent and are electrically connected.

The 50*e*1 of the conductor 50*e* of the printed body 100*e* shown in FIG. 2*e* and the 50*f*1 of the conductor 50*f* of the printed body 100*f* shown in FIG. 2*f* are areas sandwiched between the imaginary lines J and K and are thus electrically connected.

The 50*f*2 of the conductor 50*f* of the printed body 100*f* shown in FIG. 2*f* and the 50*g*1 of the conductor 50*g* of the printed body 100*g* shown in FIG. 2*g* are areas sandwiched between the imaginary lines L and M. The regions are physically connected with each other and are thus electrically connected.

The conductor 50*g* of the printed body 100*g* shown in FIG. 2*g* and the conductor 50*a*2 of the printed body 100*h* shown in FIG. 2*h* are in contact with each other to a wide extent and are electrically connected.

Here, with the printed body 100*d* shown in FIG. 2*d* provided, contact between the 50*c*1 of the printed body 100*c* shown in FIG. 2*c* and the 50*e*1 of the printed body 100*e* shown in FIG. 2*e* can be prevented. This can prevent short circuits and makes it possible to obtain a green multilayer body in which the coil conductor 5 is formed three-dimensionally and spirally.

Although the leading electrode 5*a*1 and the leading electrode 5*a*2 in FIG. 1A are drawn with a thickness same as a thickness (Te) of portions of the coil conductor 5 other than the leading electrodes 5*a*1 and 5*a*2, the thickness of the leading electrodes 5*a*1 and 5*a*2 may be thinner than the thickness (Te) of the portions of the coil conductor 5 other than the leading electrodes 5*a*1 and 5*a*2. With the thinner thickness of the leading electrodes 5*a*1 and 5*a*2 compared to the thickness of the portions of the coil conductor 5 other than the leading electrodes 5*a*1 and 5*a*2, it is possible to increase the number of coil windings per unit volume and increase inductance.

For example, 1 to 2 times of the printing shown in FIG. 2*a*, then 3 to 8 times of the printing shown in FIG. 2*b*, then about 10 times of the printing shown in each of FIG. 2*c* to FIG. 2*f*, further 3 to 8 times of the printing shown in FIG. 2*g*, and finally 1 to 2 times of the printing shown in FIG. 2*h* may be carried out. Printing in this manner enables the thickness of the leading electrodes 5*a*1 and 5*a*2 to be thinner than the thickness of the portions of the coil conductor 5 other than the leading electrodes 5*a*1 and 5*a*2.

While the method of manufacturing the multilayer body using a printing method is described above, the multilayer body having the above-mentioned configuration can also be obtained using a sheet method.

The obtained multilayer body is subjected to a heat treatment (a binder removal step and a firing step). Through this, the binder is removed, and a fired body (element) is obtained in which the soft magnetic metal particles included in the soft magnetic metal powder are connected with and fixed to (consolidated with) each other. A holding temperature (binder removal temperature) in the binder removal step is not limited as long as the binder can be decomposed and removed as gas. The binder removal temperature may be 300° C. or more to 450° C. or less, for example. A holding time (binder removal time) of the binder removal step is also not limited, and may be 0.5 hours or more to 2.0 hours or less, for example.

A holding temperature (firing temperature) in the firing step is not limited as long as the soft magnetic metal particles constituting the soft magnetic metal powder connect with each other. The firing temperature may be 550° C. or more to 850° C. or less. A holding time (firing time) of the firing step is also not limited, and may be 0.5 hours or more to 3.0 hours or less.

Note that, in the present embodiment, preferably an atmosphere during the binder removal and the firing is adjusted.

An annealing treatment (heat treatment) may be carried out after firing. Conditions for carrying out the annealing treatment are not limited. For example, the annealing treatment may be carried out at a temperature ranging from 500 to 800° C. for 0.5 to 2.0 hours. An atmosphere after the annealing is also not limited.

Next, the terminal electrodes 3 are formed on the element. A method of forming the terminal electrodes 3 is not limited. Usually, a metal (e.g., Ag) that becomes the terminal electrodes 3 is made into slurry together with an additive, such as a solvent and a binder.

The multilayer coil 1 according to the present embodiment is obtained using the above-mentioned method.

In the multilayer coil 1 according to the present embodiment, the interlayer magnetic element body 40*a* positioned in the interlayer region 24*ba*1 of the coil conductor 5 includes the first soft magnetic metal particles, and the axis-end magnetic element bodies 42*a*1 and 42*a*2 positioned on the outer side along the axis N of the coil conductor 5 include the second soft magnetic metal particles. The saturation magnetization of the first soft magnetic metal particles is higher than that of the second soft magnetic metal particles. With such configurations, the multilayer coil 1 (coil-type electronic component) according to the present embodiment has sufficiently high inductance and DC superimposition characteristic.

Second Embodiment

Hereinafter, the second embodiment is described. What is not described is similar to those in the first embodiment.

As shown in FIG. 3, in the multilayer coil 1 according to the present embodiment, the coil conductor 5 is embedded three-dimensionally in a double helix manner. While having a double helix shape, the coil conductor 5 is entirely continuous from the leading electrode 5*a*1 to the other leading electrode 5*a*2.

Specifically, in a cross section shown in FIG. 3, the double helix entirely continues in the order of the leading electrode 5*a*1 in a first layer, second-layer outer-side coil conductors 501 and 502, second-layer inner-side coil conductors 503 and 504, third-layer inner-side coil conductors 505 and 506, seventh-layer inner-side coil conductors 521 and 522, seventh-layer outer-side coil conductors 523 and 524, eighth-layer outer-side coil conductors 525 and 526, eighth-layer inner-side coil conductors 527 and 528, and the leading electrode 5*a*2 in a ninth layer.

Because the double helix structure of the coil conductor 5 makes the coil dense, inductance can be increased.

Although the number of windings in the double helix structure of the coil conductor 5 in FIG. 3 is two per layer, the number of windings of the coil conductor 5 per layer may be three or more.

A method of manufacturing the multilayer coil 1 according to the present embodiment is not limited. For example, it is possible to obtain the multilayer coil 1 according to the present embodiment by obtaining a green multilayer body in which the positions of the coil conductors, the first green sheets, and the second green sheets in FIG. 2*a* to FIG. 2*h* above are changed so that the coil conductor 5 has the three-dimensional and double helix structure.

Third Embodiment

Hereinafter, the third embodiment is described. What is not described is similar to those in the first embodiment.

As shown in FIG. 4, in the multilayer coil 1 according to the present embodiment, the axis direction of the coil conductor 5 is parallel to the Y-axis direction. FIG. 4A is a schematic cross-sectional view along the line IVA-IVA in FIG. 4. In the present embodiment, as shown in FIG. 4A, the element 2 is divided into the axis end region 2*a* and the axis center region 2*b* along the Y-axis direction, as well as into the coil region 4*a*, the inner diameter region 4*b*, and the outer diameter region 4*c* along the Z-axis direction.

In the third embodiment, regions on the outer side along imaginary lines extending along the outer sides of the outermost portions of the coil conductor 5 are the axis end regions 2*a*1 and 2*a*2, and a region on the inner side is the axis center region 2*b*. That is, in the third embodiment, the axis center region 2*b* is a region that does not include the leading electrodes 5*a*1 and 5*a*2.

Fourth Embodiment

Hereinafter, the fourth embodiment is described. What is not described is similar to those in the first embodiment.

The magnetic element body according to the present embodiment comprises the soft magnetic metal particles and a resin.

In the element obtained using the method described in the first to third embodiments, there is a void space in an area of the magnetic element body where the soft magnetic metal particles are not present. In the present embodiment, for example, the element is impregnated with the resin so that the space is filled with the resin.

With the space filled with the resin, strength (particularly bending strength) of the multilayer coil is increased. Also, with the insulation properties among the soft magnetic metal particles further increased, inductance and the Q factor are more easily improved. Further, reliability and heat resistance improve, and short circuits become less likely to occur in the multilayer coil.

A method of impregnating the resin is not limited. One example is a method through vacuum impregnation. The vacuum impregnation is carried out by immersing the element of the above multilayer coil in the resin and controlling an air pressure. The resin enters inside the magnetic element body by reducing the air pressure. Because the space is present in the magnetic element body, the resin can enter the inside, particularly the interlayer region, which is the most difficult part to enter, of the magnetic element body through capillary action via the space. The resin is impregnated in the magnetic element body, and then is cured by heating. Heating conditions differ depending on the type of the resin.

The type of the resin is not limited. For example, when a phenol resin or an epoxy resin is used, the resin sufficiently enters the space inside the magnetic element body (particularly the interlayer region), and easily fills the space sufficiently even after the curing. Further, the resin is not easily decomposed trough heating, which allows for high heat resistance. Particularly when the phenol resin or the epoxy resin is used, the resin sufficiently and easily enters the space inside the magnetic element body (particularly the interlayer region), compared to when a silicone resin is used. Note that the resin is preferably the phenol resin for being inexpensive and easily handled.

The amount of the resin in the magnetic element body of the multilayer coil obtained in the end is preferably 0.5 mass % or more to 3.0 mass % or less. Note that, the amount of the resin can be controlled by changing a resin solution concentration at the time of immersing, an immersing time, the number of times of immersing, and the like during impregnation, for example.

In the present embodiment, electroplating can be carried out on the terminal electrodes after resin filling. Because the space is filled with the resin, a plating solution scarcely enters inside the magnetic element body even when the magnetic element body is introduced into the plating solution. Consequently, a short circuit does not occur in the multilayer coil even after plating, and inductance is maintained high.

Although the embodiments of the present invention have been described above, the present invention is not at all limited to the above embodiments. The present invention may be put into practice in various forms without departing from the scope of the invention.

For example, as shown in FIG. 1B, the first magnetic element body 40 does not have to include the first inner-diameter magnetic element body 40*b* shown in FIG. 1A. In other words, the second inner-diameter magnetic element body 42*b* may constitute the entire axis-center inner-diameter region 24*bb*.

For example, as shown in FIG. 1C, the second outer-diameter magnetic element body 42*c* may be included along the axis center region 2*b* on the outer side of the first outer-diameter magnetic element body 40*c*.

For example, as shown in FIG. 1D, the first magnetic element body 40 may exclude the first inner-diameter magnetic element body 40*b* and the first outer-diameter magnetic element body 40*c* shown in FIG. 1A. In other words, the axis-center inner-diameter region 24*bb* may entirely comprise the second inner-diameter magnetic element body 42*b*, and the axis-center outer-diameter region 24*bc* may entirely comprise the second outer-diameter magnetic element body 42*c*.

For example, as shown in FIG. 1E, the axis-center inner-diameter region 24*bb* may entirely comprise the first inner-diameter magnetic element body 40*b*, and the axis-center outer-diameter region 24*bc* may entirely comprise the first outer-diameter magnetic element body 40*c*. In other words, the second magnetic element body 42 may exclude the second inner-diameter magnetic element body 42*b* shown in FIG. 1A and the second outer-diameter magnetic element body 42*c* shown in FIG. 1C.

A method of changing the positions of the first magnetic element body 40 and the second magnetic element body 42 as shown in FIG. 1B to FIG. 1E is not limited. The method may be, for example, changing the positions of the first green sheets and the second green sheets in the printed bodies 100*a* to 100*h* in FIG. 2*a* to FIG. 2*h* shown above so that the first magnetic element body 40 and the second magnetic element body 42 are positioned as desired.

Also, while the second inner-diameter magnetic element body proportion and the second outer-diameter magnetic element body proportion are calculated using a cross section perpendicular to the axis direction of the coil conductor 5 above, the second inner-diameter magnetic element body proportion and the second outer-diameter magnetic element body proportion may be calculated by obtaining and using multiple cross sections parallel to the axis direction of the coil conductor 5.

Although the multilayer coil is used an example of the coil-type electronic component in the present embodiments, transformers, choke coils, coils, etc. are known as other coil-type electronic components. Also, the coil-type electronic component according to the present embodiments is suitably used in a power supply circuit or the like in various electronic apparatus (e.g., mobile devices) to serve as an inductor or impedance.

EXAMPLES

Hereinafter, the present invention is described in detail using examples. However, the present invention is not limited to these examples.

(Each sample of Tables 1 to 3)

Each raw material was prepared so that each soft magnetic metal powder had a composition shown in Table 1 or Table 2. Each of [Mass %] and [ppm] in Table 1 is the amount of each constituent in 100 mass % of the total amount of Fe and Si. Each of [Mass %] and [ppm] in Table 2 is the amount of each constituent in 100 mass % of the total amount of Fe, Ni, Si, Co, Cr, and P.

Each obtained soft magnetic metal powder was subjected to a composition analysis using an ICP analysis method, and thus was confirmed to have a composition shown in Table 1 or Table 2. Therefore, also in examples and comparative examples described later, a composition of prepared raw materials and a composition of each soft magnetic metal powder were deemed to be the same.

A saturation magnetization of each obtained soft magnetic metal powder was measured using a vibrating sample magnetometer (VSM-3S-15 manufactured by Toei Industry Co., Ltd.) at an external magnetic field of 795.8 kA/m (10 kOe). Tables 1 and 2 show results.

The obtained first soft magnetic metal powder was used to prepare a first paste, and the obtained second soft magnetic metal powder was used to prepare a second paste.

In printed bodies 100*a* to 100*h* shown in FIG. 2*a* to FIG. 2*h*, positions of first green sheets and second green sheets were changed so that a second magnetic element body 42 constitutes axis end regions 2*a*1 and 2*a*2 and the first magnetic element body 40 constitutes an interlayer region 24*ba*1, an axis-center inner-diameter region 24*bb*, and an axis-center outer-diameter region 24*bc* as shown in FIG. 1E. Thus, a green multilayer body having a thickness of 0.8 mm was obtained. The green multilayer body included a Ag conductor, and the number of windings was 7.5 Ts. Then, the obtained green multilayer body was cut into a shape of 1.6 mm×0.8 mm so that a green multilayer coil was obtained.

Next, a binder removal treatment was carried out for the obtained green multilayer coil at 400° C. in an inert atmosphere ($N_2$ gas atmosphere). After that, the green multilayer coil was fired at 750° C. for 1 hour in a reduced atmosphere (mixed gas atmosphere of $N_2$ gas and $H_2$ gas, having a hydrogen concentration of 1.0%). A fired body was thus obtained.

A terminal electrode paste was applied to both end faces of the obtained fired body and dried, then a baking treatment was carried out at 700° C. for 1 hour in an atmosphere having an oxygen partial pressure of 1%. Thus, terminal electrodes 3 were formed, and a baked multilayer coil was obtained.

Each obtained baked multilayer coil was impregnated with a resin. Specifically, the baked multilayer coil was vacuum impregnated with a mixture of phenol resin raw materials, then heated at 150° C. for 2 hours to have the resin cured. Thus, the resin filled a void space of the baked multilayer coil. Note that, a solvent and the like included in the raw material mixture evaporated when the resin was cured. Then, electroplating was carried out to form a Ni plating layer and a Sn plating layer on the terminal electrodes. Thus, a multilayer coil 1 was obtained.

Regarding internal dimensions of the obtained multilayer coil, a coil conductor 5 had a thickness (Te) of 40 μm and the interlayer region 24*ba*1 had a thickness (Ti) of 15 μm.

A composition analysis and measurement of an average particle size, saturation magnetization, inductance, and DC superimposition characteristic of the obtained multilayer coil were carried out as follows.

<Composition Analysis>

Regarding the multilayer coil of Example 1, elemental mapping photographs of the axis end regions 2*a*1 and 2*a*2, the axis-center inner-diameter region 24*bb*, the interlayer region 24*ba*1, and the axis-center outer-diameter region 24*bc* were obtained to carry out the composition analysis. From the analysis results, it was confirmed that first soft magnetic metal particles having the same composition as that of the first soft magnetic metal powder were formed in a portion where the first soft magnetic metal powder was used, and second soft magnetic metal particles having the same composition as that of the second soft magnetic metal powder were formed in a portion where the second soft magnetic metal powder was used. Consequently, also in the examples and comparative examples described later, it was assumed that the first soft magnetic metal particles having the same composition as that of the first soft magnetic metal powder were formed in the portion where the first soft magnetic metal powder was used, and the second soft magnetic metal particles having the same composition as that of the second soft magnetic metal powder were formed in the portion where the second soft magnetic metal powder was used.

<Average Particle Size>

Circle equivalent diameters of the first soft magnetic metal particles and the second soft magnetic metal particles were calculated by analyzing an image of a cross section of the multilayer coil of Example 1 using SEM. The circle equivalent diameters were used as particle sizes. The particle sizes of four hundred first soft magnetic metal particles and the particle sizes of four hundred second soft magnetic metal particles were calculated, and an average particle size of the first soft magnetic metal particles and an average particle size of the second soft magnetic metal particles were calculated. Table 1 shows the average particle size of the first soft magnetic metal particles, and Table 2 shows the average particle size of the second soft magnetic metal particles.

<Saturation Magnetization (Ms)>

The first magnetic element body and the second magnetic element body of the multilayer coil of Example 1 were subjected to microfabrication through laser processing to be cut. Saturation magnetization of the first soft magnetic metal particles and the second soft magnetic metal particles was measured using a vibrating sample magnetometer (VSM-3S-15 manufactured by Toei Industry Co., Ltd.) at an external magnetic field of 795.8 kA/m (10 kOe). From the results, it was confirmed that the saturation magnetization of the first soft magnetic metal particles was the same as that of the first soft magnetic metal powder, and the saturation magnetization of the second soft magnetic metal particles was the same as that of the second soft magnetic metal powder. Consequently, also in the examples and comparative examples described later, it was assumed that the saturation magnetization of the first soft magnetic metal particles was the same as that of the first soft magnetic metal powder, and the saturation magnetization of the second soft magnetic metal particles was the same as that of the second soft magnetic metal powder.

<Measurement of Inductance (L)>

Inductance (L) of the obtained multilayer coil was measured using an LCR meter (4285A manufactured by HEWLETT PACKARD) at f=2 MHz and I=0.1 A. An average of the L values of thirty multilayer coils in each example or comparative example was calculated. Table 3 shows the results. Also, ΔL/L was calculated as a rate of change in comparison to the average value of L of "Comparison target in terms of ΔL/L and ΔIdc/Idc" in Table 3. For example, because the "Comparison target in terms of ΔL/L and ΔIdc/Idc" of Example 1 was "Comparative Example 1," ΔL/L of Example 1 was calculated using the following equation (1).

$$\Delta L/L \text{ of Example1} = 100\times\{(L \text{ of Example1} - L \text{ of Comparative Example1})/L \text{ of Comparative Example1}\} \quad (1)$$

<DC Superimposition Characteristic Idc>

Inductance of the obtained multilayer coil at the time when a DC current was applied was measured. The inductance was measured while the applied DC current was changed from 0 to 3 A and was graphed with the horizontal axis of DC current and the vertical axis of inductance. An electric current value at the time when the inductance decreased by 30% compared to the inductance value at the time when a DC current of 0 A was applied was calculated as an Idc. An average of the Idc values of thirty multilayer coils in each example or comparative example was calculated. Table 3 shows the results. Also, ΔIdc/Idc was calculated as a rate of change in comparison to the average value of Idc of a comparison target. For example, because the "Comparison target in terms of ΔL/L and ΔIdc/Idc" of Example 1 was "Comparative Example 1," ΔIdc/Idc of Example 1 was calculated using the following equation (2).

$$\Delta Idc/Idc \text{ of Example1} = 100\times\{(Idc \text{ of Example1} - Idc \text{ of Comparative Example1})/Idc \text{ of Comparative Example1}\} \quad (2)$$

<Determination>

When ΔL/L was −30% or more and ΔIdc/Idc was 50% or more, an example or a comparative example was deemed passed and was marked "OK" in Table 3. When ΔL/L or ΔIdc/Idc was out of the above range, an example or a comparative example was marked "NG" (not good) in Table 3.

TABLE 1

| | First soft magnetic metal particles (first soft magnetic metal powder) | | | | | | | | | |
|---|---|---|---|---|---|---|---|---|---|---|
| | | [μm] Average particle size of first soft magnetic metal | [T] | [Mass %] | | | | | | [ppm] |
| Sample No. | Material | particles | Ms | Fe | Ni | Si | Co | Al | Cr | P |
| Comparative Example 1 | Fe—Ni | 5.0 | 1.40 | 49.0 | 42.0 | 3.0 | 6.0 | | | 500 |
| Example 1 | Fe—Si | 5.0 | 1.80 | 93.5 | | 6.5 | | | | 300 |
| Comparative Example 1a | Fe—Ni | 5.0 | 1.40 | 49.0 | 42.0 | 3.0 | 6.0 | | | 500 |
| Example 1a | Fe—Ni | 5.0 | 1.50 | 41.0 | 25.0 | 3.0 | 31.0 | | | 500 |
| Comparative Example 2 | Fe—Si—Al | 5.0 | 1.00 | 85.0 | | 9.5 | | 5.5 | | 30 |
| Example 2 | Fe—Si | 5.0 | 1.80 | 93.5 | | 6.5 | | | | 300 |
| Comparative Example 3 | Fe—Si | 5.0 | 1.65 | 92.0 | | 8.0 | | | | 300 |
| Example 3 | Fe—Si | 5.0 | 1.92 | 95.5 | | 4.5 | | | | 300 |
| Comparative Example 1 | Fe—Ni | 5.0 | 1.40 | 49.0 | 42.0 | 3.0 | 6.0 | | | 500 |
| Example 3a | Fe | 5.0 | 2.10 | 100 | | | | | | 0 |
| Comparative Example 3b | Fe—Si—Cr | 5.0 | 1.65 | 92.0 | | 3.5 | | | 4.5 | 0 |
| Example 3b | Fe—Si—Cr | 5.0 | 2.08 | 97.0 | | 2.0 | | | 1.0 | 0 |
| Comparative Example 1 | Fe—Ni | 5.0 | 1.40 | 49.0 | 42.0 | 3.0 | 6.0 | | | 500 |
| Example 3c | Fe—Si—Cr | 5.0 | 1.65 | 92 | | 3.5 | | | 5 | 0 |
| Comparative Example 3d | Fe—Si—Cr | 5.0 | 1.65 | 92.0 | | 3.5 | | | 4.5 | 0 |
| Example 3d | Fe—Si | 5.0 | 1.80 | 94 | | 6.5 | | | | 300 |

TABLE 2

| | Second soft magnetic metal particles (second soft magnetic metal powder) | | | | | | | | | |
|---|---|---|---|---|---|---|---|---|---|---|
| | | [μm] Average particle size of second soft magnetic | [T] | [Mass %] | | | | | | [ppm] |
| Sample No. | Material | metal particles | Ms | Fe | Ni | Si | Co | Al | Cr | P |
| Comparative Example 1 | Fe—Ni | 5.0 | 1.40 | 49.0 | 42.0 | 3.0 | 6.0 | | | 500 |
| Example 1 | Fe—Ni | 5.0 | 1.40 | 49.0 | 42.0 | 3.0 | 6.0 | | | 500 |
| Comparative Example 1a | Fe—Si | 5.0 | 1.80 | 93.5 | | 6.5 | | | | 300 |
| Example 1a | Fe—Ni | 5.0 | 1.40 | 49.0 | 42.0 | 3.0 | 6.0 | | | 500 |
| Comparative Example 2 | Fe—Si—Al | 5.0 | 1.00 | 85.0 | | 9.5 | | 5.5 | | 30 |
| Example 2 | Fe—Si—Al | 5.0 | 1.00 | 85.0 | | 9.5 | | 5.5 | | 30 |
| Comparative Example 3 | Fe—Si | 5.0 | 1.65 | 92.0 | | 8.0 | | | | 300 |
| Example 3 | Fe—Si | 5.0 | 1.65 | 92.0 | | 8.0 | | | | 300 |
| Comparative Example 1 | Fe—Ni | 5.0 | 1.40 | 49.0 | 42.0 | 3.0 | 6.0 | | | 500 |
| Example 3a | Fe—Ni | 5.0 | 1.40 | 49.0 | 42.0 | 3.0 | 6.0 | | | 500 |
| Comparative Example 3b | Fe—Si—Cr | 5.0 | 1.65 | 92.0 | | 3.5 | | | 4.5 | 0 |
| Example 3b | Fe—Si—Cr | 5.0 | 1.65 | 92.0 | | 3.5 | | | 4.5 | 0 |
| Comparative Example 1 | Fe—Ni | 5.0 | 1.40 | 49.0 | 42.0 | 3.0 | 6.0 | | | 500 |
| Example 3c | Fe—Ni | 5.0 | 1.40 | 49.0 | 42.0 | 3.0 | 6.0 | | | 500 |
| Comparative Example 3d | Fe—Si—Cr | 5.0 | 1.65 | 92.0 | | 3.5 | | | 4.5 | 0 |
| Example 3d | Fe—Si—Cr | 5.0 | 1.65 | 92.0 | | 3.5 | | | 4.5 | 0 |

TABLE 3

| | Coil-type electronic component (multilayer coil) | | | | | |
|---|---|---|---|---|---|---|
| Sample No. | [pH] L | [%] ΔL/L | [A] Idc | [%] ΔIdc/Idc | Comparison target in terms of ΔL/L and ΔIdc/Idc | Determination |
| Comparative Example 1 | 0.800 | — | 1.00 | — | — | NG |
| Example 1 | 0.570 | −28.8 | 2.00 | 100.0 | Comparative Example 1 | OK |
| Comparative Example 1a | 0.752 | −6.0 | 1.05 | 5.0 | Comparative Example 1 | NG |
| Example 1a | 0.801 | 0.1 | 1.62 | 62.0 | Comparative Example 1 | OK |
| Comparative Example 2 | 0.430 | — | 1.20 | — | — | NG |
| Example 2 | 0.567 | 31.9 | 1.95 | 62.5 | Comparative Example 2 | OK |
| Comparative Example 3 | 0.500 | — | 1.25 | — | — | NG |
| Example 3 | 0.641 | −19.9 | 1.88 | 88.0 | Comparative Example 1 | OK |
| Comparative Example 1 | 0.800 | — | 1.00 | — | — | NG |
| Example 3a | 0.631 | −21.1 | 1.90 | 90.0 | Comparative Example 1 | OK |
| Comparative Example 3b | 0.451 | — | 1.16 | — | — | NG |

TABLE 3-continued

| Sample No. | Coil-type electronic component (multilayer coil) [pH] L | [%] ΔL/L | [A] Idc | [%] ΔIdc/Idc | Comparison target in terms of ΔL/L and ΔIdc/Idc | Determination |
|---|---|---|---|---|---|---|
| Example 3b | 0.469 | 4.0 | 1.74 | 50.0 | Comparative Example 3b | OK |
| Comparative Example 1 | 0.800 | — | 1.00 | — | — | NG |
| Example 3c | 0.713 | −10.9 | 1.51 | 51.0 | Comparative Example 1 | OK |
| Comparative Example 3d | 0.451 | — | 1.25 | — | — | NG |
| Example 3d | 0.481 | 6.7 | 1.88 | 50.4 | Comparative Example 3d | OK |

From Tables 1 to 3, it was confirmed that an example was deemed OK in the determination and had sufficiently high inductance and DC superimposition characteristic, when the interlayer region was comprised of the first magnetic element body, the axis end regions were comprised of the second magnetic element body, and the saturation magnetization of the first soft magnetic metal particles was higher than that of the second soft magnetic metal particles (Examples 1, la, 2, 3, 3a, 3b, 3c, and 3d).

Note that, in Comparative Examples 1, 2, 3, 3b, and 3d, the first soft magnetic metal particles and the second soft magnetic metal particles had the same composition and had a structure shown in FIG. 5A.

Comparative Example 1a had a structure shown in FIG. 5B because the first soft magnetic metal particles had lower saturation magnetization than that of the second soft magnetic metal particles.

(Each sample of Tables 4 to 6)

In each sample of Tables 4 to 6, the composition of the soft magnetic metal powder was changed to have the composition shown in Table 4 or Table 5, and the second inner-diameter magnetic element body proportion and the second outer-diameter magnetic element body proportion were changed to be as shown in Table 6. Other than the above conditions, the multilayer coil was obtained in the same manner as the samples of Tables 1 to 3 were obtained, the average particle sizes of the soft magnetic metal particles were measured, L and Idc were measured, and (ΔL/L) and (ΔIdc/Idc) were calculated. Table 4 shows the average particle size of the first soft magnetic metal particles, and Table 5 shows the average particle size of the second soft magnetic metal particles. Table 6 shows L, Idc, (ΔL/L), and (ΔIdc/Idc).

In each sample of Tables 4 to 6, "(ΔL/L)+(ΔIdc/Idc)" was also calculated as a balance indicator of "Inductance L" and "DC superimposition characteristic Idc." Table 6 shows the results.

TABLE 4

| Sample No. | First soft magnetic metal particles (first soft magnetic metal powder) Material | [μm] Average particle size of first soft magnetic metal particles | [T] Ms | [Mass %] Fe | Ni | Si | Co | Al | [ppm] P |
|---|---|---|---|---|---|---|---|---|---|
| Comparative Example 1 | Fe—Ni | 5.0 | 1.40 | 49.0 | 42.0 | 3.0 | 6.0 | | 500 |
| Example 5a | Fe—Si | 5.0 | 1.80 | 93.5 | | 6.5 | | | 300 |
| Example 5 | Fe—Si | 5.0 | 1.80 | 93.5 | | 6.5 | | | 300 |
| Example 4 | Fe—Si | 5.0 | 1.80 | 93.5 | | 6.5 | | | 300 |
| Example 6 | Fe—Si | 5.0 | 1.80 | 93.5 | | 6.5 | | | 300 |
| Example 7 | Fe—Si | 5.0 | 1.80 | 93.5 | | 6.5 | | | 300 |
| Comparative Example 4 | Fe—Ni | 5.0 | 1.40 | 49.0 | 42.0 | 3.0 | 6.0 | | 500 |
| Example 9a | Fe—Si | 5.0 | 1.80 | 93.5 | | 6.5 | | | 300 |
| Example 9 | Fe—Si | 5.0 | 1.80 | 93.5 | | 6.5 | | | 300 |
| Example 8 | Fe—Si | 5.0 | 1.80 | 93.5 | | 6.5 | | | 300 |
| Example 10 | Fe—Si | 5.0 | 1.80 | 93.5 | | 6.5 | | | 300 |

TABLE 5

| Sample No. | Second soft magnetic metal particles (second soft magnetic metal powder) Material | [μm] Average particle size of second soft magnetic metal particles | [T] Ms | [Mass %] Fe | Ni | Si | Co | Al | [ppm] P |
|---|---|---|---|---|---|---|---|---|---|
| Comparative Example 1 | Fe—Ni | 5.0 | 1.40 | 49.0 | 42.0 | 3.0 | 6.0 | | 500 |
| Example 5a | Fe—Ni | 5.0 | 1.40 | 49.0 | 42.0 | 3.0 | 6.0 | | 500 |
| Example 5 | Fe—Ni | 5.0 | 1.40 | 49.0 | 42.0 | 3.0 | 6.0 | | 500 |
| Example 4 | Fe—Ni | 5.0 | 1.40 | 49.0 | 42.0 | 3.0 | 6.0 | | 500 |
| Example 6 | Fe—Ni | 5.0 | 1.40 | 49.0 | 42.0 | 3.0 | 6.0 | | 500 |
| Example 7 | Fe—Ni | 5.0 | 1.40 | 49.0 | 42.0 | 3.0 | 6.0 | | 500 |
| Comparative Example 4 | Fe—Si | 5.0 | 1.80 | 93.5 | | 6.5 | | | 300 |

TABLE 5-continued

| | Second soft magnetic metal particles (second soft magnetic metal powder) | | | | | | | | |
|---|---|---|---|---|---|---|---|---|---|
| | | [μm] Average particle size of second soft magnetic | [T] | [Mass %] | | | | | [ppm] |
| Sample No. | Material | metal particles | Ms | Fe | Ni | Si | Co | Al | P |
| Example 9a | Fe—Ni | 5.0 | 1.40 | 49.0 | 42.0 | 3.0 | 6.0 | | 500 |
| Example 9 | Fe—Ni | 5.0 | 1.40 | 49.0 | 42.0 | 3.0 | 6.0 | | 500 |
| Example 8 | Fe—Ni | 5.0 | 1.40 | 49.0 | 42.0 | 3.0 | 6.0 | | 500 |
| Example 10 | Fe—Ni | 5.0 | 1.40 | 49.0 | 42.0 | 3.0 | 6.0 | | 500 |

TABLE 6

| | Coil-type electronic component (multilayer coil) | | | | | | | | |
|---|---|---|---|---|---|---|---|---|---|
| Sample No. | Second inner-diameter magnetic element body proportion | Second outer-diameter magnetic element body proportion | [μH] L | [%] ΔL/L | [A] Idc | [%] ΔIdc/Idc | Comparison target in terms of ΔL/L and ΔIdc/Idc | Determination | [%] (ΔL/L) + (ΔIdc/Idc) (Balance indicator) |
| Comparative Example 1 | 0% | 0% | 0.800 | — | 1.00 | — | — | NG | — |
| Example 5a | 25% | 0% | 0.720 | −10.0 | 1.90 | 90.0 | Comparative Example 1 | OK | 80.0 |
| Example 5 | 30% | 0% | 0.773 | −3.4 | 1.85 | 85.0 | Comparative Example 1 | OK | 81.6 |
| Example 4 | 45% | 0% | 0.798 | −0.3 | 1.82 | 82.0 | Comparative Example 1 | OK | 81.8 |
| Example 6 | 75% | 0% | 0.829 | 3.6 | 1.78 | 78.0 | Comparative Example 1 | OK | 81.6 |
| Example 7 | 100% | 0% | 0.850 | 6.3 | 1.75 | 75.0 | Comparative Example 1 | OK | 81.3 |
| Comparative Example 4 | 45% | 0% | 0.520 | −35.0 | 1.45 | 45.0 | Comparative Example 1 | NG | — |
| Example 9a | 45% | 10% | 0.805 | 0.6 | 1.76 | 76.0 | Comparative Example 1 | OK | 76.6 |
| Example 9 | 45% | 15% | 0.825 | 3.1 | 1.75 | 75.0 | Comparative Example 1 | OK | 78.1 |
| Example 8 | 45% | 50% | 0.845 | 5.6 | 1.73 | 73.0 | Comparative Example 1 | OK | 78.6 |
| Example 10 | 100% | 100% | 0.920 | 15.0 | 1.64 | 64.0 | Comparative Example 1 | OK | 79.0 |

FIG. 6 is a graph with the second inner-diameter magnetic element body proportion (%) on the X-axis and (ΔL/L)+(ΔIdc/Idc) (%) on the Y-axis regarding Examples 5a and 4 to 7.

From Table 6 and FIG. 6, it was confirmed that, when the second inner-diameter magnetic element body proportion was 30% or more, (ΔL/L)+(ΔIdc/Idc) was high and a better balance between inductance and DC superimposition characteristic was ensured.

From Table 6, it was confirmed that, when the second outer-diameter magnetic element body proportion was 15% or more, a better balance between inductance and DC superimposition characteristic was ensured.

Comparative Example 4 had a structure shown in FIG. 5*c* because the first soft magnetic metal particles had lower saturation magnetization than that of the second soft magnetic metal particles.

(Each sample of Tables 7 to 9)

In each sample of Tables 7 to 9, the composition of the soft magnetic metal powder was changed to have the composition shown in Table 7 or Table 8. In addition, the positions of the coil conductors, the first green sheets, and the second green sheets in FIG. 2*a* to FIG. 2*h* were changed so that the coil conductor 5 had the three-dimensional and double helix structure as shown in FIG. 3, and a green multilayer body was obtained. Further, the second inner-diameter magnetic element body proportion and the second outer-diameter magnetic element body proportion were changed as shown in Table 9. Other than the above conditions, the multilayer coil was obtained in the same manner as the samples of Tables 1 to 3 were obtained, then the average particle sizes of the soft magnetic metal particles were measured, L and Idc were measured, and "ΔL/L" and "ΔIdc/Idc" were calculated. Table 7 shows the average particle size of the first soft magnetic metal particles, and Table 8 shows the average particle size of the second soft magnetic metal particles. Table 9 shows L, Idc, (ΔL/L), and (ΔIdc/Idc).

TABLE 7

| Sample No. | Material | First soft magnetic metal particles (first soft magnetic metal powder) [μm] Average particle size of first soft magnetic metal particles | [T] Ms | [Mass %] Fe | Ni | Si | Co | Al | (ppm) P |
|---|---|---|---|---|---|---|---|---|---|
| Comparative Example 5 | Fe—Ni | 5.0 | 1.40 | 49.0 | 42.0 | 3.0 | 6.0 | | 500 |
| Example 11 | Fe—Si | 5.0 | 1.80 | 93.5 | | 6.5 | | | 300 |
| Example 12 | Fe—Si | 5.0 | 1.80 | 93.5 | | 6.5 | | | 300 |
| Example 13 | Fe—Si | 5.0 | 1.80 | 93.5 | | 6.5 | | | 300 |
| Example 14 | Fe—Si | 5.0 | 1.80 | 93.5 | | 6.5 | | | 300 |
| Example 15 | Fe—Si | 5.0 | 1.80 | 93.5 | | 6.5 | | | 300 |

TABLE 8

| Sample No. | Material | Second soft magnetic metal particles (second soft magnetic metal powder) [μm] Average particle size of second soft magnetic metal particles | [T] Ms | [Mass %] Fe | Ni | Si | Co | Al | [ppm] P |
|---|---|---|---|---|---|---|---|---|---|
| Comparative Example 5 | Fe—Ni | 5.0 | 1.40 | 49.0 | 42.0 | 3.0 | 6.0 | | 500 |
| Example 11 | Fe—Ni | 5.0 | 1.40 | 49.0 | 42.0 | 3.0 | 6.0 | | 500 |
| Example 12 | Fe—Ni | 5.0 | 1.40 | 49.0 | 42.0 | 3.0 | 6.0 | | 500 |
| Example 13 | Fe—Ni | 5.0 | 1.40 | 49.0 | 42.0 | 3.0 | 6.0 | | 500 |
| Example 14 | Fe—Ni | 5.0 | 1.40 | 49.0 | 42.0 | 3.0 | 6.0 | | 500 |
| Example 15 | Fe—Ni | 5.0 | 1.40 | 49.0 | 42.0 | 3.0 | 6.0 | | 500 |

TABLE 9

| Sample No. | Coil-type electronic component (multilayer coil) Second inner-diameter magnetic element body proportion | Second outer-diameter magnetic element body proportion | [μH] L | [%] ΔL/L | [A] Idc | [%] ΔIdc/Idc | Comparison target in terms of ΔL/L and ΔIdc/Idc | Determination |
|---|---|---|---|---|---|---|---|---|
| Comparative Example 5 | 0% | 0% | 0.911 | — | 0.85 | — | — | NG |
| Example 11 | 0% | 0% | 0.690 | −27.6 | 1.90 | 105.0 | Comparative Example 5 | OK |
| Example 12 | 45% | 0% | 1.050 | 17.4 | 1.70 | 85.0 | Comparative Example 5 | OK |
| Example 13 | 100% | 0% | 1.250 | 42.4 | 1.60 | 75.0 | Comparative Example 5 | OK |
| Example 14 | 45% | 50% | 1.150 | 29.9 | 1.65 | 80.0 | Comparative Example 5 | OK |
| Example 15 | 100% | 100% | 1.350 | 54.9 | 1.50 | 65.0 | Comparative Example 5 | OK |

From Table 9, it was confirmed that an example was deemed OK in the determination and had sufficiently high inductance and DC superimposition characteristic even when the coil conductor 5 had the three-dimensional and double helix structure, as long as the interlayer region was comprised of the first magnetic element body, the axis end regions were comprised of the second magnetic element body, and the saturation magnetization of the first soft magnetic metal particles was higher than that of the second soft magnetic metal particles (Examples 11 to 15).

(Each sample of Tables 10 to 21)

In each sample of Table 10 to Table 21, the multilayer coil was obtained in the same manner as in Example 4, except that the composition and the average particle sizes of the soft magnetic metal powder were changed to the composition and the average particle size shown in Tables 10, 11, 13, 14, 16, 17, 19, and 20. That is, each sample of Tables 10 to 21 was prepared so that the sample had a structure shown in FIG. 1A.

Regarding the obtained multilayer coil, the average particle sizes of the soft magnetic metal particles were measured, L and Idc were measured, and (ΔL/L) and (ΔIdc/Idc) were calculated in the same manner as described above. Tables 10, 13, 16, and 19 show the average particle size of the first soft magnetic metal particles, and Tables 11, 14, 17, and 20 show the average particle size of the second soft magnetic metal particles. Tables 12, 15, 18, and 21 show L, Idc, (ΔL/L), and (ΔIdc/Idc).

Additionally, in each sample of Tables 10 to 21, "Prevention of plating elongation" and "Number of short circuits" were measured using a method described below.

<Prevention of Plating Elongation>

Evaluation of prevention of plating elongation was performed through observation of the appearance of the multilayer coil. When plating elongation was not observed at all, an example or a comparative example was evaluated as A. When a plating elongation of 50 μm or less was observed, an example or a comparative example was evaluated as B. When a plating elongation of more than 50 μm to less than 400 μm was observed, an example or a comparative example was evaluated as C. When a plating elongation of 400 μm or more was observed, an example or a comparative example was evaluated as D. Tables 12, 15, 18, and 21 show the results.

<Number of Short Circuits>

Thirty multilayer coils were prepared, and the number of the multilayer coils in which a short circuit occurred was measured using an LCR meter. An example or a comparative example was deemed good when the number of short circuits was 0/30. Tables 12, 15, 18, and 21 show the results.

TABLE 10

| | First soft magnetic metal particles (first soft magnetic metal powder) | | | | | | | | |
|---|---|---|---|---|---|---|---|---|---|
| | | [μm] Average particle size of first soft magnetic | [T] | [Mass %] | | | | | [ppm] |
| Sample No. | Material | metal particles | Ms | Fe | Ni | Si | Co | Cr | P |
| Comparative Example 1 | Fe—Ni | 5.0 | 1.40 | 49.0 | 42.0 | 3.0 | 6.0 | | 300 |
| Example 4 | Fe—Si | 5.0 | 1.80 | 93.5 | | 6.5 | | | 300 |
| Example 16a | Fe—Si | 0.8 | 1.80 | 93.5 | | 6.5 | | | 300 |
| Example 16 | Fe—Si | 1.0 | 1.80 | 93.5 | | 6.5 | | | 300 |
| Example 17 | Fe—Si | 3.0 | 1.80 | 93.5 | | 6.5 | | | 300 |
| Example 18 | Fe—Si | 6.0 | 1.80 | 93.5 | | 6.5 | | | 300 |
| Example 19 | Fe—Si | 7.0 | 1.80 | 93.5 | | 6.5 | | | 300 |
| Example 20a | Fe—Si | 5.0 | 1.80 | 93.5 | | 6.5 | | | 300 |
| Example 20 | Fe—Si | 5.0 | 1.80 | 93.5 | | 6.5 | | | 300 |
| Example 21 | Fe—Si | 5.0 | 1.80 | 93.5 | | 6.5 | | | 300 |
| Example 22 | Fe—Si | 5.0 | 1.80 | 93.5 | | 6.5 | | | 300 |
| Example 23 | Fe—Si | 5.0 | 1.80 | 93.5 | | 6.5 | | | 300 |
| Example 24 | Fe—Si | 5.0 | 1.80 | 93.5 | | 6.5 | | | 300 |

TABLE 11

| | Second soft magnetic metal particles (second soft magnetic metal powder) | | | | | | | | |
|---|---|---|---|---|---|---|---|---|---|
| | | [μm] Average particle size of second soft magnetic | [T] | [Mass %] | | | | | [ppm] |
| Sample No. | Material | metal particles | Ms | Fe | Ni | Si | Co | Cr | P |
| Comparative Example 1 | Fe—Ni | 5.0 | 1.40 | 49.0 | 42.0 | 3.0 | 6.0 | | 500 |
| Example 4 | Fe—Ni | 5.0 | 1.40 | 49.0 | 42.0 | 3.0 | 6.0 | | 500 |
| Example 16a | Fe—Ni | 5.0 | 1.40 | 49.0 | 42.0 | 3.0 | 6.0 | | 500 |
| Example 16 | Fe—Ni | 5.0 | 1.40 | 49.0 | 42.0 | 3.0 | 6.0 | | 500 |
| Example 17 | Fe—Ni | 5.0 | 1.40 | 49.0 | 42.0 | 3.0 | 6.0 | | 500 |
| Example 18 | Fe—Ni | 5.0 | 1.40 | 49.0 | 42.0 | 3.0 | 6.0 | | 500 |
| Example 19 | Fe—Ni | 5.0 | 1.40 | 49.0 | 42.0 | 3.0 | 6.0 | | 500 |
| Example 20a | Fe—Ni | 0.8 | 1.40 | 49.0 | 42.0 | 3.0 | 6.0 | | 500 |
| Example 20 | Fe—Ni | 1.0 | 1.40 | 49.0 | 42.0 | 3.0 | 6.0 | | 500 |
| Example 21 | Fe—Ni | 7.0 | 1.40 | 49.0 | 42.0 | 3.0 | 6.0 | | 500 |
| Example 22 | Fe—Ni | 10.0 | 1.40 | 49.0 | 42.0 | 3.0 | 6.0 | | 500 |
| Example 23 | Fe—Ni | 15.0 | 1.40 | 49.0 | 42.0 | 3.0 | 6.0 | | 500 |
| Example 24 | Fe—Ni | 16.0 | 1.40 | 49.0 | 42.0 | 3.0 | 6.0 | | 500 |

TABLE 12

| | Coil-type electronic component (multilayer coil) | | | | | | | | | | |
|---|---|---|---|---|---|---|---|---|---|---|---|
| Sample No. | Second inner-diameter magnetic element body proportion | Second outer-diameter magnetic element body proportion | [μH] L | [%] ΔL/L | [A] Idc | [%] ΔIdc/Idc | Comparison target in terms of ΔL/L and ΔIdc/Idc | Determination | [%] ΔL/L + ΔIdc/Idc (Balance indicator) | Prevention of plating elongation | Number of short circuits |
| Comparative Example 1 | 0% | 0% | 0.800 | — | 1.00 | — | Comparative Example 1 | NG | — | A | 0/30 |
| Example 4 | 45% | 0% | 0.798 | −0.3 | 1.80 | 80.0 | Comparative Example 1 | OK | 79.8 | A | 0/30 |
| Example 16a | 45% | 0% | 0.630 | −21.3 | 1.92 | 92.0 | Comparative Example 1 | OK | 70.8 | A | 0/30 |
| Example 16 | 45% | 0% | 0.683 | −14.6 | 1.90 | 90.0 | Comparative Example 1 | OK | 75.4 | A | 0/30 |

TABLE 12-continued

| Sample No. | Coil-type electronic component (multilayer coil) Second inner-diameter magnetic element body proportion | Second outer-diameter magnetic element body proportion | [μH] L | [%] ΔL/L | [A] Idc | [%] ΔIdc/Idc | Comparison target in terms of ΔL/L and ΔIdc/Idc | Determination | [%] ΔL/L + ΔIdc/Idc (Balance indicator) | Prevention of plating elongation | Number of short circuits |
|---|---|---|---|---|---|---|---|---|---|---|---|
| Example 17 | 45% | 0% | 0.774 | −3.3 | 1.84 | 84.0 | Comparative Example 1 | OK | 80.8 | A | 0/30 |
| Example 18 | 45% | 0% | 0.820 | 2.5 | 1.77 | 77.0 | Comparative Example 1 | OK | 79.5 | A | 1/30 |
| Example 19 | 45% | 0% | 0.810 | 1.3 | 1.77 | 77.0 | Comparative Example 1 | OK | 78.3 | B | 12/30 |
| Example 20a | 45% | 0% | 0.580 | −27.5 | 1.93 | 93.0 | Comparative Example 1 | OK | 65.5 | A | 0/30 |
| Example 20 | 45% | 0% | 0.641 | −19.9 | 1.88 | 88.0 | Comparative Example 1 | OK | 68.1 | A | 0/30 |
| Example 21 | 45% | 0% | 0.820 | 2.5 | 1.78 | 78.0 | Comparative Example 1 | OK | 80.5 | A | 0/30 |
| Example 22 | 45% | 0% | 0.859 | 7.4 | 1.73 | 73.0 | Comparative Example 1 | OK | 80.4 | A | 0/30 |
| Example 23 | 45% | 0% | 0.870 | 8.7 | 1.70 | 70.0 | Comparative Example 1 | OK | 78.8 | B | 0/30 |
| Example 24 | 45% | 0% | 0.876 | 9.5 | 1.68 | 68.0 | Comparative Example 1 | OK | 77.5 | C | 5/30 |

TABLE 13

| Sample No. | Material | First soft magnetic metal particles (first soft magnetic metal powder) [μm] Average particle size of first soft magnetic metal particles | [T] Ms | [Mass %] Fe | Ni | Si | Co | Cr | [ppm] P |
|---|---|---|---|---|---|---|---|---|---|
| Example 25 | Fe—Si | 5.0 | 1.80 | 93.5 | | | 6.5 | | 10 |
| Example 26 | Fe—Si | 5.0 | 1.80 | 93.5 | | | 6.5 | | 40 |
| Example 27 | Fe—Si | 5.0 | 1.80 | 93.5 | | | 6.5 | | 650 |
| Example 28 | Fe—Si | 5.0 | 1.80 | 93.5 | | | 6.5 | | 700 |
| Example 29 | Fe—Si | 5.0 | 1.80 | 93.5 | | | 6.5 | | 300 |
| Example 30 | Fe—Si | 5.0 | 1.80 | 93.5 | | | 6.5 | | 300 |
| Example 31 | Fe—Si | 5.0 | 1.80 | 93.5 | | | 6.5 | | 300 |
| Example 32 | Fe—Si | 5.0 | 1.80 | 93.5 | | | 6.5 | | 300 |
| Example 33 | Fe—Si | 5.0 | 1.80 | 93.5 | | | 6.5 | | 300 |

TABLE 14

| Sample No. | Material | Second soft magnetic metal particles (second soft magnetic metal powder) [μm] Average particle size of second soft magnetic metal particles | [T] Ms | [Mass %] Fe | Ni | Si | Co | Cr | [ppm] P |
|---|---|---|---|---|---|---|---|---|---|
| Example 25 | Fe—Ni | 5.0 | 1.40 | 49.0 | 42.0 | 3.0 | 6.0 | | 500 |
| Example 26 | Fe—Ni | 5.0 | 1.40 | 49.0 | 42.0 | 3.0 | 6.0 | | 500 |
| Example 27 | Fe—Ni | 5.0 | 1.40 | 49.0 | 42.0 | 3.0 | 6.0 | | 500 |
| Example 28 | Fe—Ni | 5.0 | 1.40 | 49.0 | 42.0 | 3.0 | 6.0 | | 500 |
| Example 29 | Fe—Ni | 5.0 | 1.40 | 49.0 | 42.0 | 3.0 | 6.0 | | 10 |
| Example 30 | Fe—Ni | 5.0 | 1.40 | 49.0 | 42.0 | 3.0 | 6.0 | | 100 |
| Example 31 | Fe—Ni | 5.0 | 1.40 | 49.0 | 42.0 | 3.0 | 6.0 | | 1000 |
| Example 32 | Fe—Ni | 5.0 | 1.40 | 49.0 | 42.0 | 3.0 | 6.0 | | 5000 |
| Example 33 | Fe—Ni | 5.0 | 1.40 | 49.0 | 42.0 | 3.0 | 6.0 | | 6000 |

TABLE 15

| Sample No. | Coil-type electronic component (multilayer coil) Second inner-diameter magnetic element body proportion | Second outer-diameter magnetic element body proportion | [μH] L | [%] ΔL/L | [A] Idc | [%] ΔIdc/Idc | Comparison target in terms of ΔL/L and ΔIdc/Idc | Determination | [%] ΔL/L + ΔIdc/Idc (Balance indicator) | Prevention of plating elongation | Number of short circuits |
|---|---|---|---|---|---|---|---|---|---|---|---|
| Example 25 | 45% | 0% | 0.734 | −8.3 | 1.76 | 76.0 | Comparative Example 1 | OK | 67.8 | C | 7/30 |
| Example 26 | 45% | 0% | 0.791 | −1.1 | 1.80 | 80.0 | Comparative Example 1 | OK | 78.9 | A | 0/30 |
| Example 27 | 45% | 0% | 0.721 | −9.9 | 1.84 | 84.0 | Comparative Example 1 | OK | 74.1 | A | 0/30 |
| Example 28 | 45% | 0% | 0.620 | −22.5 | 1.89 | 89.0 | Comparative Example 1 | OK | 66.5 | A | 0/30 |
| Example 29 | 45% | 0% | 0.770 | −3.8 | 1.78 | 78.0 | Comparative Example 1 | OK | 74.3 | C | 3/30 |
| Example 30 | 45% | 0% | 0.796 | −0.5 | 1.80 | 80.0 | Comparative Example 1 | OK | 79.5 | A | 0/30 |
| Example 31 | 45% | 0% | 0.801 | 0.1 | 1.79 | 79.0 | Comparative Example 1 | OK | 79.1 | A | 0/30 |
| Example 32 | 45% | 0% | 0.753 | −5.9 | 1.82 | 82.0 | Comparative Example 1 | OK | 76.1 | A | 0/30 |
| Example 33 | 45% | 0% | 0.619 | −22.6 | 1.91 | 91.0 | Comparative Example 1 | OK | 68.4 | A | 0/30 |

TABLE 16

| | First soft magnetic metal particles (first soft magnetic metal powder) | | | | | | | | |
|---|---|---|---|---|---|---|---|---|---|
| | | [μm] Average particle size of first soft magnetic | [T] | [Mass %] | | | | | [ppm] |
| Sample No. | Material | metal particles | Ms | Fe | Ni | Si | Co | Cr | P |
| Example 34 | Fe—Si | 5.0 | 1.80 | 93.5 | | | 6.5 | | 300 |
| Example 35 | Fe—Si | 5.0 | 1.80 | 93.5 | | | 6.5 | | 300 |
| Example 36 | Fe—Si | 5.0 | 1.80 | 93.5 | | | 6.5 | | 300 |
| Example 37 | Fe—Si | 5.0 | 1.80 | 93.5 | | | 6.5 | | 300 |
| Example 38 | Fe—Si | 5.0 | 1.80 | 93.5 | | | 6.5 | | 300 |
| Example 39 | Fe—Si | 5.0 | 1.80 | 93.5 | | | 6.5 | | 300 |

TABLE 17

| | Second soft magnetic metal particles (second soft magnetic metal powder) | | | | | | | | |
|---|---|---|---|---|---|---|---|---|---|
| | | [μm] Average particle size of second soft magnetic | [T] | [Mass %] | | | | | [ppm] |
| Sample No. | Material | metal particles | Ms | Fe | Ni | Si | Co | Cr | P |
| Example 34 | Fe—Ni | 5.0 | 1.05 | 39.5 | 56.0 | 3.0 | 1.5 | | 500 |
| Example 35 | Fe—Ni | 5.0 | 1.31 | 50.0 | 45.0 | 3.0 | 2.0 | | 500 |
| Example 36 | Fe—Ni | 5.0 | 1.48 | 48.0 | 29.0 | 3.0 | 20.0 | | 500 |
| Example 37 | Fe—Ni | 5.0 | 1.50 | 41.0 | 25.0 | 3.0 | 31.0 | | 500 |
| Example 38 | Fe—Ni | 5.0 | 1.51 | 37.0 | 20.0 | 3.0 | 40.0 | | 500 |
| Example 39 | Fe—Ni | 5.0 | 1.51 | 33.0 | 14.0 | 3.0 | 50.0 | | 500 |

TABLE 18

| Sample No. | Coil-type electronic component (multilayer coil): Second inner-diameter magnetic element body proportion | Second outer-diameter magnetic element body proportion | [μH] L | [%] ΔL/L | [A] Idc | [%] ΔIdc/Idc | Comparison target in terms of ΔL/L and ΔIdc/Idc | Determination | [%] ΔL/L + ΔIdc/Idc (Balance indicator) | Prevention of plating elongation | Number of short circuits |
|---|---|---|---|---|---|---|---|---|---|---|---|
| Example 34 | 45% | 0% | 0.809 | 1.1 | 1.50 | 50.0 | Comparative Example 1 | OK | 51.1 | A | 0/30 |
| Example 35 | 45% | 0% | 0.808 | 1.0 | 1.70 | 70.0 | Comparative Example 1 | OK | 71.0 | A | 0/30 |
| Example 36 | 45% | 0% | 0.807 | 0.9 | 1.87 | 87.0 | Comparative Example 1 | OK | 87.9 | A | 0/30 |
| Example 37 | 45% | 0% | 0.811 | 1.4 | 1.88 | 88.0 | Comparative Example 1 | OK | 89.4 | A | 0/30 |
| Example 38 | 45% | 0% | 0.800 | 0.0 | 1.89 | 89.0 | Comparative Example 1 | OK | 89.0 | A | 0/30 |
| Example 39 | 45% | 0% | 0.680 | −15.0 | 2.01 | 101.0 | Comparative Example 1 | OK | 86.0 | A | 0/30 |

TABLE 19

| Sample No. | First soft magnetic metal particles (first soft magnetic metal powder): Material | [μm] Average particle size of first soft magnetic metal particles | [T] Ms | [Mass %] Fe | Ni | Si | Co | Cr | [ppm] P |
|---|---|---|---|---|---|---|---|---|---|
| Example 40 | Fe—Si | 5.0 | 1.95 | 97.0 | | | 3.0 | | 300 |
| Example 41 | Fe—Si | 5.0 | 1.93 | 96.5 | | | 3.5 | | 300 |
| Example 42 | Fe—Si | 5.0 | 1.85 | 94.5 | | | 5.5 | | 300 |
| Example 43 | Fe—Si | 5.0 | 1.72 | 92.5 | | | 7.5 | | 300 |
| Example 44 | Fe—Si | 5.0 | 1.65 | 92.0 | | | 8.0 | | 300 |
| Example 45 | Fe—Si | 5.0 | 1.80 | 93.5 | | | 6.5 | | 300 |
| Example 46 | Fe—Si | 5.0 | 1.80 | 93.5 | | | 6.5 | | 300 |
| Example 47 | Fe—Si | 5.0 | 1.80 | 93.5 | | | 6.5 | | 300 |
| Example 48 | Fe—Si | 5.0 | 1.80 | 93.5 | | | 6.5 | | 300 |
| Example 49 | Fe—Si | 5.0 | 1.80 | 93.5 | | | 6.5 | | 300 |
| Example 50 | Fe—Si | 5.0 | 1.80 | 93.5 | | | 6.5 | | 300 |
| Example 51 | Fe—Si | 5.0 | 1.80 | 93.5 | | | 6.5 | | 300 |

TABLE 20

| Sample No. | Second soft magnetic metal particles (second soft magnetic metal powder): Material | [μm] Average particle size of second soft magnetic metal particles | [T] Ms | [Mass %] Fe | Ni | Si | Co | Cr | [ppm] P |
|---|---|---|---|---|---|---|---|---|---|
| Example 40 | Fe—Ni | 5.0 | 1.40 | 49.0 | 42.0 | 3.0 | 6.0 | | 500 |
| Example 41 | Fe—Ni | 5.0 | 1.40 | 49.0 | 42.0 | 3.0 | 6.0 | | 500 |
| Example 42 | Fe—Ni | 5.0 | 1.40 | 49.0 | 42.0 | 3.0 | 6.0 | | 500 |
| Example 43 | Fe—Ni | 5.0 | 1.40 | 49.0 | 42.0 | 3.0 | 6.0 | | 500 |
| Example 44 | Fe—Ni | 5.0 | 1.40 | 49.0 | 42.0 | 3.0 | 6.0 | | 500 |
| Example 45 | Fe—Ni | 5.0 | 1.55 | 50.5 | 42.0 | 1.5 | 6.0 | | 500 |
| Example 46 | Fe—Ni | 5.0 | 1.50 | 50.0 | 42.0 | 2.0 | 6.0 | | 500 |
| Example 47 | Fe—Ni | 5.0 | 1.10 | 46.0 | 42.0 | 6.0 | 6.0 | | 500 |
| Example 48 | Fe—Ni | 5.0 | 1.00 | 45.0 | 42.0 | 7.0 | 6.0 | | 500 |
| Example 49 | Fe—Ni | 5.0 | 1.32 | 40.6 | 24.6 | 3.0 | 30.0 | 1.8 | 500 |
| Example 50 | Fe—Ni | 5.0 | 1.40 | 41.0 | 25.0 | 3.0 | 30.0 | 1.0 | 500 |
| Example 51 | Fe—Ni | 5.0 | 1.45 | 41.3 | 25.2 | 3.0 | 30.0 | 0.5 | 500 |

TABLE 21

| | Coil-type electronic component (multilayer coil) | | | | | | | | | | | |
|---|---|---|---|---|---|---|---|---|---|---|---|---|
| Sample No. | Second inner-diameter magnetic element body proportion | Second outer-diameter magnetic element body proportion | [μH] L | [%] ΔL/L | [A] Idc | [%] ΔIdc/Idc | Comparison target in terms of ΔL/L and ΔIdc/Idc | Determination | [%] ΔL/L + ΔIdc/Idc (Balance indicator) | Prevention of plating elongation | Number of short circuits |
| Example 40 | 45% | 0% | 0.811 | 1.4 | 1.93 | 93.0 | Comparative Example 1 | OK | 94.4 | C | 8/30 |
| Example 41 | 45% | 0% | 0.810 | 1.3 | 1.94 | 94.0 | Comparative Example 1 | OK | 95.3 | B | 0/30 |
| Example 42 | 45% | 0% | 0.805 | 0.6 | 1.88 | 88.0 | Comparative Example 1 | OK | 88.6 | A | 0/30 |
| Example 43 | 45% | 0% | 0.799 | −0.1 | 1.75 | 75.0 | Comparative Example 1 | OK | 74.9 | A | 0/30 |
| Example 44 | 45% | 0% | 0.760 | −5.0 | 1.50 | 50.0 | Comparative Example 1 | OK | 45.0 | A | 0/30 |
| Example 45 | 45% | 0% | 0.804 | 0.5 | 1.90 | 90.0 | Comparative Example 1 | OK | 90.5 | C | 11/30 |
| Example 46 | 45% | 0% | 0.803 | 0.4 | 1.90 | 90.0 | Comparative Example 1 | OK | 90.4 | B | 0/30 |
| Example 47 | 45% | 0% | 0.799 | −0.1 | 1.60 | 60.0 | Comparative Example 1 | OK | 59.9 | A | 0/30 |
| Example 48 | 45% | 0% | 0.791 | −1.1 | 1.50 | 50.0 | Comparative Example 1 | OK | 48.9 | A | 0/30 |
| Example 49 | 45% | 0% | 0.720 | −10.0 | 1.84 | 84.0 | Comparative Example 1 | OK | 74.0 | A | 0/30 |
| Example 50 | 45% | 0% | 0.880 | 10.0 | 1.72 | 72.0 | Comparative Example 1 | OK | 82.0 | A | 0/30 |
| Example 51 | 45% | 0% | 0.829 | 3.6 | 1.76 | 76.0 | Comparative Example 1 | OK | 79.6 | A | 0/30 |

From Tables 10 to 12, it was confirmed that, when the average particle size of the first soft magnetic metal particles was 1 to 6 μm (Examples 4 and 16 to 18), a better balance between inductance and DC superimposition characteristic was ensured, prevention of plating elongation was more highly evaluated, and the number of short circuits was smaller.

From Tables 10 to 12, it was confirmed that, when the average particle size of the second soft magnetic metal particles was 1 to 15 μm (Examples 4 and 20 to 23), a better balance between inductance and DC superimposition characteristic was ensured, and the number of short circuits was smaller.

From Tables 13 to 15, it was confirmed that, when the amount of P in the first soft magnetic metal particles was 10 to 40 ppm (Examples 26 to 28), prevention of plating elongation was more highly evaluated, and the number of short circuits was smaller.

From Tables 13 to 15, it was confirmed that, when the amount of P in the second soft magnetic metal particles was 100 to 6000 ppm (Examples 30 to 33), prevention of plating elongation was more highly evaluated, and the number of short circuits was smaller.

From Tables 16 to 18, it was confirmed that, when the amount of Ni in the second soft magnetic metal particles was larger than 14.0 mass % and less than 56.0 mass % (Examples 35 to 38), inductance was large, and a better balance between inductance and DC superimposition characteristic was ensured.

From Tables 19 to 21, it was confirmed that, when the amount of Si in the first soft magnetic metal particles was 3.5 to 7.5 mass % (Examples 41 to 43), a better balance between inductance and DC superimposition characteristic was ensured, prevention of plating elongation was more highly evaluated, and the number of short circuits was smaller.

From Tables 19 to 21, it was confirmed that, when the amount of Si in the second soft magnetic metal particles was 2.0 to 6.0 mass % (Examples 46 and 47), a better balance between inductance and DC superimposition characteristic was ensured, prevention of plating elongation was more highly evaluated, and the number of short circuits was smaller.

DESCRIPTION OF THE REFERENCE NUMERALS

1 . . . multilayer coil
2 . . . element
**2*a*1, 2*a*2** . . . axis end region
**2*b*** . . . axis center region
**24*ba*** . . . axis-center coil region
**24*ba*1** . . . interlayer region
**24*bb*** . . . axis-center inner-diameter region
**24*bc*** . . . axis-center outer-diameter region
3 . . . terminal electrode
4 . . . magnetic element body
**4*a*** . . . coil region
**4*b*** . . . inner diameter region
**4*c*** . . . outer diameter region
40 . . . first magnetic element body
**40*a*** . . . first interlayer magnetic element body
**40*b*** . . . first inner-diameter magnetic element body
**40*c*** . . . first outer-diameter magnetic element body
**400*a* to 400*h*** . . . first green sheet
42 . . . second magnetic element body
**42*a*1, 42*a*2** . . . second axis-end magnetic element body
**42*a*** . . . second interlayer magnetic element body
**42*b*** . . . second inner-diameter magnetic element body
**42*c*** . . . second outer-diameter magnetic element body
**420*a* to 420*h*** . . . second green sheet
5 . . . coil conductor
501, 502 . . . second-layer outer-side coil conductor
503, 504 . . . second-layer inner-side coil conductor
505, 506 . . . third-layer inner-side coil conductor

521, 522 . . . seventh-layer inner-side coil conductor
523, 524 . . . seventh-layer outer-side coil conductor
525, 526 . . . eighth-layer outer-side coil conductor
527, 528 . . . eighth-layer inner-side coil conductor
50*b*, 50*b*1, 50*c*, 50*c*1, 50*c*2, 50*d*, 50*d*1, 50*e*, 50*e*1, 50*f*, 50*f*1, 50*f*2, 50*g*, 50*g*1 . . . conductor
5*a*1, 5*a*2 . . . leading electrode
50*a*1, 50*a*2 . . . conductor
100*a* to 100*h* . . . printed body

What is claimed is:

1. A coil-type electronic component comprising an element including a magnetic element body and a coil conductor, wherein a portion of the magnetic element body in between layers of the coil conductor adjacent to each other in an axis direction of the coil conductor includes first soft magnetic metal particles, a portion of the magnetic element body on an outer side along the axis includes second soft magnetic metal particles, the first soft magnetic metal particles have a saturation magnetization higher than that of the second soft magnetic metal particles, and a second inner-diameter magnetic element body occupying at least a part of an axis-center inner-diameter region of the element including the axis of the coil conductor includes the second soft magnetic metal particles.

2. A coil-type electronic component according to claim 1, wherein the first soft magnetic metal particles comprise an Fe—Si-based alloy.

3. A coil-type electronic component according to claim 1, wherein the second soft magnetic metal particles comprise an Fe—Ni-based alloy.

4. A coil-type electronic component according to claim 1, wherein a proportion of an area of the second inner-diameter magnetic element body in an area of the axis-center inner-diameter region is 30% or more in a cross section perpendicular to the axis of the coil conductor.

5. A coil-type electronic component according to claim 1, wherein the first soft magnetic metal particles have an average particle size of 1 to 6 μm.

6. A coil-type electronic component according to claim 1, wherein the second soft magnetic metal particles have an average particle size of 1 to 15 μm.

7. A coil-type electronic component according to claim 1, wherein a second outer-diameter magnetic element body occupying at least a part of an axis-center outer-diameter region of the element on an outer side in a radial direction of the coil conductor includes the second soft magnetic metal particles.

8. A coil-type electronic component according to claim 7, wherein a proportion of an area of the second outer-diameter magnetic element body in an area of the axis-center outer-diameter region is 15% or more in a cross section perpendicular to the axis of the coil conductor.

9. A coil-type electronic component according to claim 1, wherein in the axis direction of the coil conductor, lower saturation magnetization regions sandwich a higher saturation magnetization region.

* * * * *